US008175346B2

(12) United States Patent
Rowe et al.

(10) Patent No.: US 8,175,346 B2
(45) Date of Patent: *May 8, 2012

(54) WHOLE-HAND MULTISPECTRAL BIOMETRIC IMAGING

(75) Inventors: Robert K. Rowe, Corrales, NM (US); Matthew Ennis, Cedar Crest, NM (US); Stephen P. Corcoran, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 759 days.

This patent is subject to a terminal disclaimer.

(21) Appl. No.: 12/136,475

(22) Filed: Jun. 10, 2008

(65) Prior Publication Data
US 2009/0080709 A1    Mar. 26, 2009

Related U.S. Application Data

(63) Continuation-in-part of application No. 12/100,597, filed on Apr. 10, 2008, and a continuation-in-part of application No. 11/779,998, filed on Jul. 19, 2007, now Pat. No. 7,899,217.

(60) Provisional application No. 60/943,207, filed on Jun. 11, 2007, provisional application No. 60/911,007, filed on Apr. 10, 2007, provisional application No. 60/832,233, filed on Jul. 19, 2006.

(51) Int. Cl.
*G06K 9/00*    (2006.01)

(52) U.S. Cl. .................. 382/124; 340/5.53; 340/5.83

(58) Field of Classification Search .............. 382/124; 340/5.53, 5.83
See application file for complete search history.

(56) References Cited

U.S. PATENT DOCUMENTS

| | | | |
|---|---|---|---|
| 3,508,830 A | 4/1970 | Hopkins et al. | |
| 3,619,060 A | 11/1971 | Johnson | |
| 3,854,319 A | 12/1974 | Burroughs et al. | |
| 3,872,443 A | 3/1975 | Ott | |
| 3,910,701 A | 10/1975 | Henderson et al. | |
| RE29,008 E | 10/1976 | Ott | |
| 4,035,083 A | 7/1977 | Woodriff et al. | |
| 4,142,797 A | 3/1979 | Astheimer | |
| 4,169,676 A | 10/1979 | Kaiser | |
| 4,170,987 A | 10/1979 | Anselmo et al. | |
| 4,260,220 A | 4/1981 | Whitehead | |
| 4,322,163 A | 3/1982 | Schiller | |
| 4,427,889 A | 1/1984 | Muller | |

(Continued)

FOREIGN PATENT DOCUMENTS
CN    1307711 A    8/2001
(Continued)

OTHER PUBLICATIONS

International Search Report of PCT/US2010/046852 mailed Dec. 29, 2010, 5 pages.

(Continued)

*Primary Examiner* — John Strege
(74) *Attorney, Agent, or Firm* — Marsh Fischmann & Breyfogle LLP

(57) ABSTRACT

A number of biometric systems and methods are disclosed. A system according to one embodiment includes an illumination subsystem, an imaging subsystem, and an analyzer. The illumination subsystem is disposed to illuminate a target space. The imaging subsystem is configured to image the target space under distinct optical conditions. The analyzer is provided in communication with the illumination subsystem, the imaging subsystem, and the three-dimensional subsystem. The analyzer also has instructions to operate the subsystems to collect substantially simultaneously a plurality of images of the object disposed at the predetermined spatial location under multispectral conditions.

21 Claims, 24 Drawing Sheets

U.S. PATENT DOCUMENTS

| | | |
|---|---|---|
| 4,537,484 A | 8/1985 | Fowler |
| 4,598,715 A | 7/1986 | Machler et al. |
| 4,653,880 A | 3/1987 | Sting et al. |
| 4,654,530 A | 3/1987 | Dybwad |
| 4,655,225 A | 4/1987 | Dahne et al. |
| 4,656,562 A | 4/1987 | Sugino |
| 4,657,397 A | 4/1987 | Oehler et al. |
| 4,661,706 A | 4/1987 | Messerschmidt et al. |
| 4,684,255 A | 8/1987 | Ford |
| 4,699,149 A | 10/1987 | Rice |
| 4,712,912 A | 12/1987 | Messerschmidt |
| 4,730,882 A | 3/1988 | Messerschmidt |
| 4,747,147 A | 5/1988 | Sparrow |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,937,764 A | 6/1990 | Komatsu et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,055,658 A | 10/1991 | Cockburn |
| 5,068,536 A | 11/1991 | Rosenthal |
| 5,070,874 A | 12/1991 | Barnes et al. |
| 5,077,803 A | 12/1991 | Kato et al. |
| 5,088,817 A | 2/1992 | Igaki et al. |
| 5,109,428 A | 4/1992 | Igaki et al. |
| 5,146,102 A | 9/1992 | Higuchi et al. |
| 5,158,082 A | 10/1992 | Jones |
| 5,163,094 A | 11/1992 | Prokoski et al. |
| 5,177,802 A | 1/1993 | Fujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,335,288 A | 8/1994 | Faulkner |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,098 A | 5/1995 | Benaron |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong et al. |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,729,619 A | 3/1998 | Puma |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,751,836 A | 5/1998 | Wildes et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladner et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,859,420 A | 1/1999 | Borza |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Anderson et al. |
| 5,935,062 A | 8/1999 | Messerschmidt et al. |
| 5,945,676 A | 8/1999 | Khalil |
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 5,978,495 A | 11/1999 | Thomopoulos et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |

| Patent No. | Date | Name |
|---|---|---|
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fately |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,081,612 A | 6/2000 | Gutkowicz-Krusin et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |
| 6,115,673 A | 9/2000 | Malin et al. |
| 6,122,042 A | 9/2000 | Wunderman et al. |
| 6,122,394 A | 9/2000 | Neukermans et al. |
| 6,122,737 A | 9/2000 | Bjorn et al. |
| 6,125,192 A | 9/2000 | Bjorn et al. |
| 6,141,101 A | 10/2000 | Bleier et al. |
| 6,147,749 A | 11/2000 | Kubo et al. |
| 6,148,094 A | 11/2000 | Kinsella |
| 6,152,876 A | 11/2000 | Robinson et al. |
| 6,154,658 A | 11/2000 | Caci |
| 6,157,041 A | 12/2000 | Thomas et al. |
| 6,159,147 A | 12/2000 | Lichter et al. |
| 6,172,743 B1 | 1/2001 | Kley et al. |
| 6,175,407 B1 | 1/2001 | Sartor |
| 6,181,414 B1 | 1/2001 | Raz et al. |
| 6,181,958 B1 | 1/2001 | Steuer et al. |
| 6,188,781 B1 | 2/2001 | Brownlee |
| 6,193,153 B1 | 2/2001 | Lambert |
| 6,208,749 B1 | 3/2001 | Gutkowicz-Krusin |
| 6,212,424 B1 | 4/2001 | Robinson |
| 6,226,541 B1 | 5/2001 | Eppstein et al. |
| 6,229,908 B1 | 5/2001 | Edmonds et al. |
| 6,230,034 B1 | 5/2001 | Messerschmidt et al. |
| 6,236,047 B1 | 5/2001 | Malin et al. |
| 6,240,306 B1 | 5/2001 | Rohrscheib et al. |
| 6,240,309 B1 | 5/2001 | Yamashita et al. |
| 6,241,663 B1 | 6/2001 | Wu et al. |
| 6,256,523 B1 | 7/2001 | Diab et al. |
| 6,272,367 B1 | 8/2001 | Chance |
| 6,280,381 B1 | 8/2001 | Malin et al. |
| 6,282,303 B1 | 8/2001 | Brownlee |
| 6,285,895 B1 | 9/2001 | Ristolainen et al. |
| 6,292,576 B1 | 9/2001 | Brownlee |
| 6,301,375 B1 | 10/2001 | Choi |
| 6,301,815 B1 | 10/2001 | Sliwa |
| 6,304,767 B1 | 10/2001 | Soller et al. |
| 6,307,633 B1 | 10/2001 | Mandella et al. |
| 6,309,884 B1 | 10/2001 | Cooper et al. |
| 6,317,507 B1 | 11/2001 | Dolfing et al. |
| 6,324,310 B1 | 11/2001 | Brownlee |
| 6,330,346 B1 | 12/2001 | Peterson et al. |
| 6,404,904 B1 | 6/2002 | Einighammer et al. |
| 6,419,361 B2 | 7/2002 | Cabib et al. |
| 6,483,929 B1 | 11/2002 | Murakami et al. |
| 6,504,614 B1 | 1/2003 | Messerschmidt et al. |
| 6,537,225 B1 | 3/2003 | Mills |
| 6,560,352 B2 | 5/2003 | Rowe et al. |
| 6,574,490 B2 | 6/2003 | Abbink et al. |
| 6,597,945 B2 | 7/2003 | Marksteiner |
| 6,606,509 B2 | 8/2003 | Schmitt |
| 6,628,809 B1 | 9/2003 | Rowe et al. |
| 6,631,199 B1 | 10/2003 | Topping et al. |
| 6,741,729 B2 | 5/2004 | Bjorn et al. |
| 6,749,115 B2 | 6/2004 | Gressel et al. |
| 6,799,275 B1 | 9/2004 | Bjorn |
| 6,799,726 B2 | 10/2004 | Stockhammer |
| 6,816,605 B2 | 11/2004 | Rowe et al. |
| 6,825,930 B2 | 11/2004 | Cronin et al. |
| 6,853,444 B2 | 2/2005 | Haddad |
| 6,898,299 B1 | 5/2005 | Brooks |
| 6,928,181 B2 | 8/2005 | Brooks |
| 6,937,885 B1 | 8/2005 | Lewis et al. |
| 6,958,194 B1 | 10/2005 | Hopper et al. |
| 6,995,384 B2 | 2/2006 | Lee et al. |
| 7,047,419 B2 | 5/2006 | Black |
| 7,084,415 B2 | 8/2006 | Iwai |
| 7,147,153 B2 | 12/2006 | Rowe et al. |
| 7,254,255 B2 | 8/2007 | Dennis |
| 7,263,213 B2 | 8/2007 | Rowe |
| 7,287,013 B2 | 10/2007 | Schneider et al. |
| 7,347,365 B2 | 3/2008 | Rowe |
| 7,366,331 B2 | 4/2008 | Higuchi |
| 7,386,152 B2 | 6/2008 | Rowe et al. |
| 7,394,919 B2 | 7/2008 | Rowe et al. |
| 7,397,943 B2 | 7/2008 | Merbach et al. |
| 7,440,597 B2 | 10/2008 | Rowe |
| 7,460,696 B2 | 12/2008 | Rowe |
| 7,508,965 B2 | 3/2009 | Rowe et al. |
| 7,515,252 B2 | 4/2009 | Hernandez |
| 7,539,330 B2 | 5/2009 | Rowe |
| 7,545,963 B2 | 6/2009 | Rowe |
| 7,627,151 B2 | 12/2009 | Rowe |
| 7,668,350 B2 | 2/2010 | Rowe |
| 7,735,729 B2 | 6/2010 | Rowe |
| 7,751,594 B2 | 7/2010 | Rowe et al. |
| 7,801,338 B2 | 9/2010 | Rowe |
| 7,801,339 B2 | 9/2010 | Sidlauskas et al. |
| 7,804,984 B2 | 9/2010 | Sidlauskas et al. |
| 7,819,311 B2 | 10/2010 | Rowe et al. |
| 7,831,072 B2 | 11/2010 | Rowe |
| 7,835,554 B2 | 11/2010 | Rowe |
| 7,899,217 B2 | 3/2011 | Uludag et al. |
| 7,995,808 B2 | 8/2011 | Rowe et al. |
| 2002/0009213 A1 | 1/2002 | Rowe et al. |
| 2002/0065468 A1 | 5/2002 | Utzinger et al. |
| 2002/0101566 A1 | 8/2002 | Elsner et al. |
| 2002/0111546 A1 | 8/2002 | Cook et al. |
| 2002/0138768 A1 | 9/2002 | Murakami et al. |
| 2002/0171834 A1 | 11/2002 | Rowe et al. |
| 2002/0183624 A1 | 12/2002 | Rowe et al. |
| 2003/0025897 A1 | 2/2003 | Iwai |
| 2003/0044051 A1 | 3/2003 | Fujieda |
| 2003/0078504 A1 | 4/2003 | Rowe et al. |
| 2003/0095525 A1 | 5/2003 | Lavin et al. |
| 2003/0128867 A1 | 7/2003 | Bennett |
| 2003/0163710 A1 | 8/2003 | Ortiz et al. |
| 2003/0223621 A1 | 12/2003 | Rowe et al. |
| 2004/0003295 A1 | 1/2004 | Elderfield et al. |
| 2004/0008875 A1 | 1/2004 | Linares |
| 2004/0022421 A1 | 2/2004 | Endoh et al. |
| 2004/0042642 A1 | 3/2004 | Bolle et al. |
| 2004/0047493 A1 | 3/2004 | Rowe et al. |
| 2004/0114783 A1 | 6/2004 | Spycher et al. |
| 2004/0120553 A1 | 6/2004 | Stobbe |
| 2004/0125994 A1 | 7/2004 | Engles et al. |
| 2004/0179722 A1 | 9/2004 | Moritoki et al. |
| 2004/0240712 A1 | 12/2004 | Rowe et al. |
| 2004/0240713 A1 | 12/2004 | Hata |
| 2004/0264742 A1 | 12/2004 | Zhang et al. |
| 2005/0007582 A1 | 1/2005 | Villers et al. |
| 2005/0125339 A1 | 6/2005 | Tidwell et al. |
| 2005/0169504 A1 | 8/2005 | Black |
| 2005/0180620 A1 | 8/2005 | Takiguchi |
| 2005/0185847 A1 | 8/2005 | Rowe |
| 2005/0205667 A1 | 9/2005 | Rowe |
| 2005/0265585 A1 | 12/2005 | Rowe |
| 2005/0265586 A1 | 12/2005 | Rowe et al. |
| 2005/0265607 A1 | 12/2005 | Chang |
| 2005/0271258 A1 | 12/2005 | Rowe |
| 2006/0002597 A1 | 1/2006 | Rowe |
| 2006/0002598 A1 | 1/2006 | Rowe et al. |
| 2006/0045330 A1 | 3/2006 | Marion |
| 2006/0062438 A1 | 3/2006 | Rowe |
| 2006/0110015 A1 | 5/2006 | Rowe |
| 2006/0115128 A1 | 6/2006 | Mainguet |
| 2006/0171571 A1 | 8/2006 | Chan et al. |
| 2006/0173256 A1 | 8/2006 | Ridder et al. |
| 2006/0202028 A1 | 9/2006 | Rowe |
| 2006/0210120 A1 | 9/2006 | Rowe |

| | | | |
|---|---|---|---|
| 2006/0244947 A1 | 11/2006 | Rowe | |
| 2006/0274921 A1 | 12/2006 | Rowe | |
| 2007/0014437 A1 | 1/2007 | Sato | |
| 2007/0030475 A1 | 2/2007 | Rowe et al. | |
| 2007/0052827 A1 | 3/2007 | Hiltunen | |
| 2007/0116331 A1 | 5/2007 | Rowe et al. | |
| 2007/0165903 A1 | 7/2007 | Munro et al. | |
| 2008/0008359 A1 | 1/2008 | Beenau et al. | |
| 2008/0013806 A1 | 1/2008 | Hamid | |
| 2008/0025579 A1 | 1/2008 | Sidlauskas et al. | |
| 2008/0025580 A1 | 1/2008 | Sidlauskas et al. | |
| 2008/0192988 A1 | 8/2008 | Uludag et al. | |
| 2008/0232653 A1 | 9/2008 | Rowe | |
| 2008/0260211 A1 | 10/2008 | Bennett et al. | |
| 2008/0298649 A1 | 12/2008 | Ennis et al. | |
| 2009/0046903 A1 | 2/2009 | Corcoran et al. | |
| 2009/0092290 A1 | 4/2009 | Rowe | |
| 2009/0148005 A1 | 6/2009 | Rowe | |
| 2009/0245591 A1 | 10/2009 | Rowe et al. | |
| 2010/0067748 A1 | 3/2010 | Rowe | |
| 2010/0246902 A1 | 9/2010 | Rowe et al. | |
| 2011/0085708 A1 | 4/2011 | Martin et al. | |
| 2011/0211055 A1 | 9/2011 | Martin et al. | |
| 2011/0235872 A1 | 9/2011 | Rowe et al. | |

FOREIGN PATENT DOCUMENTS

| | | |
|---|---|---|
| CN | 1402183 A | 3/2003 |
| CN | 1509454 A | 6/2004 |
| DE | 10153808 A1 | 5/2003 |
| EP | 0 280 418 A1 | 8/1988 |
| EP | 0 372 748 A2 | 6/1990 |
| EP | 0 426 358 B1 | 5/1991 |
| EP | 0 449 335 A2 | 10/1991 |
| EP | 0 573 137 A2 | 12/1993 |
| EP | 0 631 137 A2 | 12/1994 |
| EP | 0 670 143 A1 | 9/1995 |
| EP | 0 681 166 A1 | 11/1995 |
| EP | 0 757 243 A1 | 2/1997 |
| EP | 0 788 000 A2 | 8/1997 |
| EP | 0 801 297 A1 | 10/1997 |
| EP | 0 836 083 A1 | 4/1998 |
| EP | 0 843 986 A2 | 5/1998 |
| EP | 0 869 348 A2 | 10/1998 |
| EP | 0 897 164 A2 | 2/1999 |
| EP | 0 897 691 A2 | 2/1999 |
| EP | 0 317 121 B1 | 5/1999 |
| EP | 0 924 656 A2 | 6/1999 |
| EP | 0 982 583 A1 | 3/2000 |
| EP | 0 990 945 A1 | 4/2000 |
| EP | 1 353 292 A1 | 10/2003 |
| EP | 1 434 162 A2 | 6/2004 |
| FR | 2761180 A1 | 9/1998 |
| JP | 61182174 A | 8/1986 |
| JP | 3016160 | 1/1991 |
| JP | 10-127585 | 5/1998 |
| JP | 7075629 A | 3/1999 |
| JP | 2001033381 A | 2/2001 |
| JP | 2001-112742 | 4/2001 |
| JP | 2001-184490 A | 7/2001 |
| JP | 2002-133402 A | 5/2002 |
| JP | 2002-517835 A | 6/2002 |
| JP | 2003050993 A | 2/2003 |
| JP | 2003-511101 A | 3/2003 |
| JP | 2003-308520 A | 10/2003 |
| WO | WO 92/00513 A1 | 1/1992 |
| WO | WO 92/17765 A1 | 10/1992 |
| WO | WO 93/00855 A1 | 1/1993 |
| WO | WO 93/07801 A1 | 4/1993 |
| WO | WO 99/27848 A1 | 6/1999 |
| WO | WO 00/30530 | 6/2000 |
| WO | WO 00/46739 A1 | 8/2000 |
| WO | WO 01/15596 A1 | 3/2001 |
| WO | WO 01/18332 A1 | 3/2001 |
| WO | WO 01/20538 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 01/65471 A | 9/2001 |
| WO | WO 01/69520 A2 | 9/2001 |
| WO | WO 02/054337 A1 | 7/2002 |
| WO | WO 02/084605 A2 | 10/2002 |
| WO | WO 02/099393 A2 | 12/2002 |
| WO | WO 03/010510 A2 | 2/2003 |
| WO | WO 03/096272 A1 | 11/2003 |
| WO | WO 2004/068388 A2 | 8/2004 |
| WO | WO 2004/068394 A1 | 8/2004 |
| WO | WO 2004/090786 A2 | 10/2004 |
| WO | WO 2006/049394 A | 5/2006 |
| WO | WO 2006/077446 A2 | 7/2006 |
| WO | WO 2006/093508 A2 | 9/2006 |

OTHER PUBLICATIONS

Maltoni et al., "Handbook of Fingerprint Recognition," 2005, pp. 58-61.

International Application No. PCT/US2008/066585, International Search Report and Written Opinion, 10 pages, Oct. 30, 2008.

Anderson, C. E. et al., "Fundamentals of Calibration Transfer Through Procrustes Analysis," Appln. Spectros., vol. 53, No. 10, pp. 1268-1276, 1999.

Ashboum, Julian, "Biometrics; Advanced Identity Verification," Springer, pp. 63-64, 2000.

Bantle, John P. et al., "Glucose Measurement in Patients With Diabetes Mellitus With Dermal Interstitial Fluid," Mosby-Year Book, Inc., 9 pages, 1997.

Berkoben et al., "Vascular Access for Hemodialysis," Clinical Dialysis, 20 pages, published on or before Oct. 30, 1997.

Blank, T.B. et al., "Transfer of Near-Infrared Multivariate Calibrations Without Standards," Anal. Chem., vol. 68, p. 2987, 1996.

Bleyer et al., "The Costs of Hospitalizations Due to Hemodialysis Access Management," Nephrology News & Issues, pp. 19, 20, 22, Jan. 1995.

Brasunas, John C. et al., "Uniform Time-Sampling Fourier Transform Spectroscopy," Applied Optics, vol. 36, No. 10, pp. 2206-2210, Apr. 1, 1997.

Brault, James W., "New Approach to High-Precision Fourier Transform Spectrometer Design," Applied Optics, Vo. 35, No. 16, pp. 2891-2896, Jun. 1, 1996.

Chang, Chong-Min et al., "A Uniform Rectangular Illuminating Optical System for Liquid Crystal Light Valve Projectors," Euro Display '96, pp. 257-260, 1996.

Coyne, Lawrence J. et al., "Distributive Fiber Optic Couplers Using Rectangular Lightguides As Mixing Elements," Information Gatekeepers, Inc., Brookline, MA, pp. 160-164, 1979.

Daugirdas et al., "Comparison of Methods to Predict the Equilibrated Kt/V (eKt/V) in the Hemo Study," National Institutes of Health, NIDDK, Bethesda, MD, Aug. 20, 1996.

de Noord, Onno E., "Multivariate Calibration Standardization," Chemometrics and Intelligent Laboratory Systems 25, pp. 85-97, 1994.

Demos, S.G. et al., "Optical Fingerprinting Using Polarisation Contrast Improvement," Electronics Letters, vol. 33, No. 7, pp. 582-584, Mar. 27, 1997.

Depner et al., "Clinical Measurement of Blood Flow in Hemodialysis Access Fistulae and Grafts by Ultrasound Dilution," Department of Nephrology, University of California, 4 pages, published on or before Oct. 30, 1997.

Despain, Alvin M. et al., "A Large-Aperture Field-Widened Interferometer-Spectrometer for Airglow Studies," Aspen International Conference on Fourier Spectroscopy, pp. 293-300, 1970.

Faber, Nicolaas, "Multivariate Sensitivity for the Interpretation of the Effect of Spectral Pretreatment Methods on Near-Infrared Calibration Model Predictions," Analytical Chemistry, vol. 71, No. 3, pp. 557-565, Feb. 1, 1999.

Fresenius USA, "Determination of Delivered Therapy Through Measurement of Effective Clearance," 1 page, Dec. 1994.

Geladi, Paul et al., "A Multivariate NIR Study of Skin Alterations in Diabetic Patients As Compared to Control Subjects," Near Infrared Spectrosc., vol. 8, pp. 217-227, 2000.

Hakim et al., "Effects of Dose of Dialysis on Morbidity and Mortality," American Journal of Kidney Diseases, vol. 23, No. 5, pp. 661-669, May 1994.

In Line Diagnostics, "Improve the Clinical Outcome of Every Patient", 2 pages, published on or before Oct. 30, 1997.

Jacobs et al., "A Disposable Urea Sensor for Continuous Monitoring of Hemodialysis Efficiency," USAIO Journal, pp. M353-M358m, 1993.

Keshaviah et al., "On-Line Monitoring of the Delivery of the Hemodialysis Prescription," Pediatric Nephrology, vol. 9, pp. S2-S8, 1995.

Krivitski, "Theory and Validation of Access Flow Measurement by Dilution Technique During Hemodialysis," Kidney International, vol. 48, pp. 244-250, 1995.

Lee et al., "Fingerprint Recognition Using Principal Gabor Basis Function", Proceedings of 2001 International Symposium on Intelligent Multimedia, Video and Speech Processing, Sections 2-3, May 2-4, 2001.

Marbach, Ralf, "Measurement Techniques for IR Spectroscopic Blood Glucose Determination," pp. 1-158, 2005.

Mardia, K.V. et al., "Multivariate Analysis," Academic Press, pp. 300-325, 1979.

Nichols et al., "Design and Testing of a White-Light, Steady-State Diffuse Reflectance Spectrometer for Determination of Optical Properties of Highly Scattering Systems," Applied Optics, vol. 36, No. 1, pp. 93-104, Jan. 1, 1997.

Nixon, Kristin A. et al., "Novel Spectroscopy-Based Technology for Biometric and Liveness Verification," Biometric Technology for Human Identification, Proceedings of SPIE, vol. 5404, No. 1, pp. 287-295, Apr. 12-13, 2004.

Pan et al., "Face Recognition in Hyperspectral Images," IEEE Transactions on Pattern Analysis and Machine Intelligence, vol. 25, No. 12, Dec. 2003.

Ripley, B.D., "Pattern Recognition and Neural Networks," Cambridge University Press, pp. 91-120, 1996.

Ronco et al., "On-Line Urea Monitoring: A Further Step Towards Adequate Dialysis Prescription and Delivery," Int'l Journal of Artificial Organs, vol. 18, No. 9, pp. 534-543, 1995.

Ross et al., "A Hybrid Fingerprint Matcher," Pattern Recognition 36, The Journal of the Pattern Recognition Society, 2003 Elsevier Science Ltd., pp. 1661-1673.

Selvaraj et al., "Fingerprint Verification Using Wavelet Transform," Proceedings of the Fifth International Conference on Computational Intelligence and Multimedia Applications, IEEE, 2003.

Service, F. John et al., "Dermal Interstitial Glucose As An Indicator of Ambient Glycemia," Diabetes Care, vol. 20, No. 9, 9 pages, Sep. 1997.

Sherman, "Recirculation in the Hemodialysis Access," Principles and Practice of Dialysis, pp. 38-46, 1994.

Sherman, "The Measurement of Dialysis Access Recirculation," American Journal of Kidney Diseases, vol. 22, No. 4, pp. 616-621, Oct. 1993.

Steuer et al., "A New Optical Technique for Monitoring Hematocrit and Circulating Blood Volume: Its Application in Renal Dialysis," Dialysis & Transplantation, vol. 22, No. 5, pp. 260-265, May 1993.

Webb, Paul, "Temperatures of Skin, Subcutaneous Tissue, Muscle and Core in Resting Men in Cold, Comfortable and Hot Conditions," European Journal of Applied Physiology, vol. 64, pp. 471-476, 1992.

Zavala, Albert et al., "Using Fingerprint Measures to Predict Other Anthropometric Variables", Human Factors, vol. 17, No. 6, pp. 591-602, 1975.

Rowe, "LumiGuard: A Novel Spectroscopic Sensor for Biometric Security Applications", American Chemical Society 225th National Meeting, Mar. 25, 2003, 20 pages.

Cassarly, W.J. et al., "Distributed Lighting Systems: Uniform Light Delivery," 1995, pp. 1698-1702.

Chinese Patent Application No. 2006/80038579.4, First Office Action mailed on Mar. 23, 2011, 7 pages.

European Patent Application No. 10166537.0, Extended European Search Report mailed on Jun. 1, 2011, 7 pages.

International Search Report and Written Opinion of PCT/US2010/025463 mailed on Jun. 30, 2010, 12 pages.

Rowe, et al. "Multispectral Fingerprint Image Acquisition," Advances in Biometrics, 2008, 22 pages.

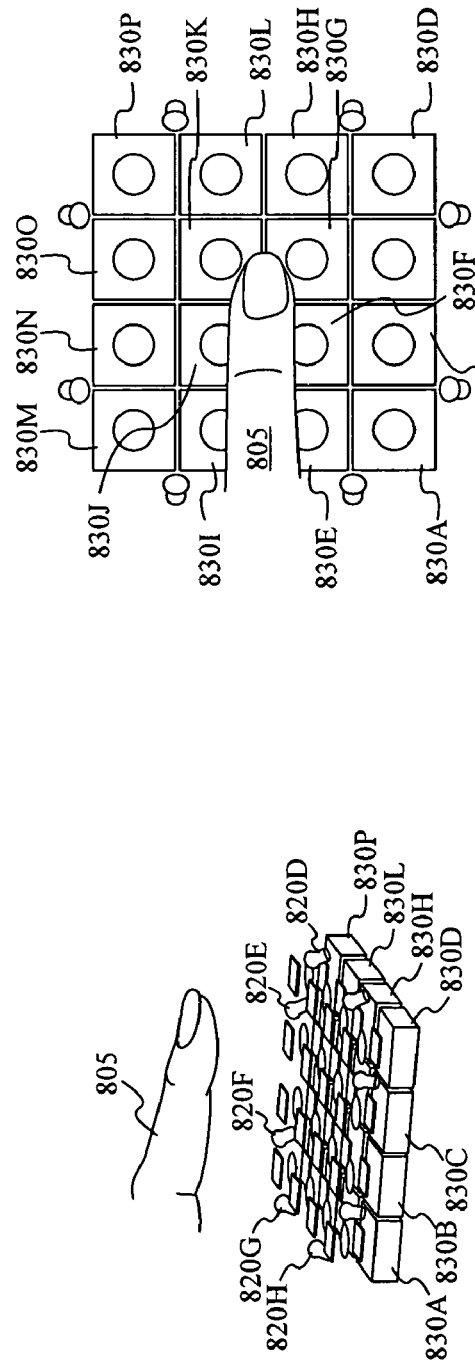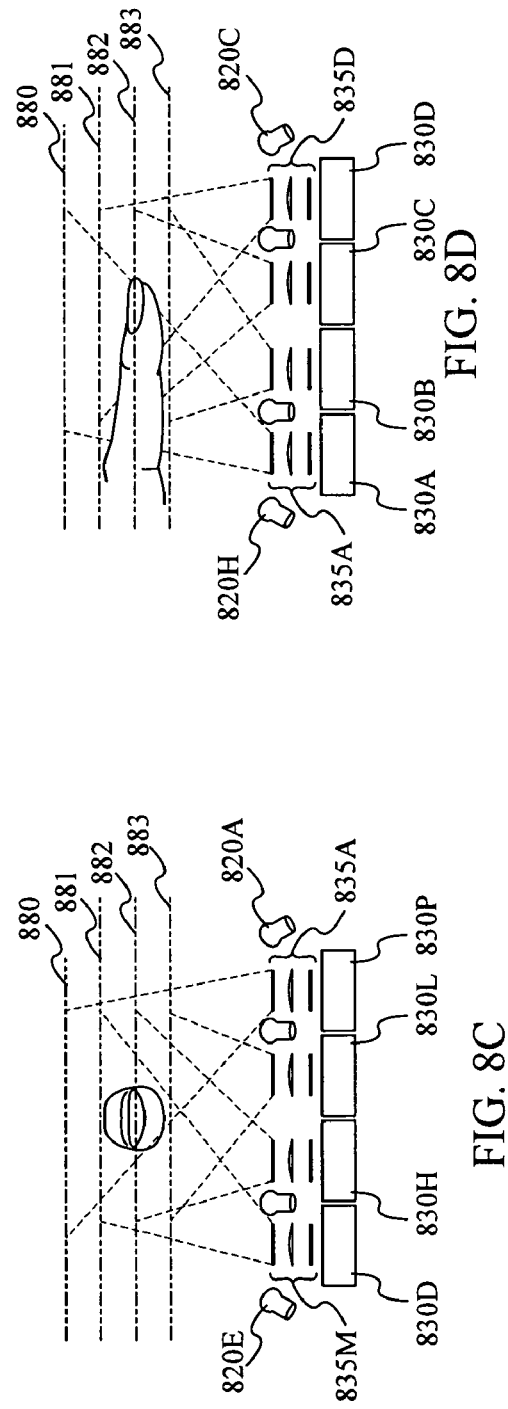

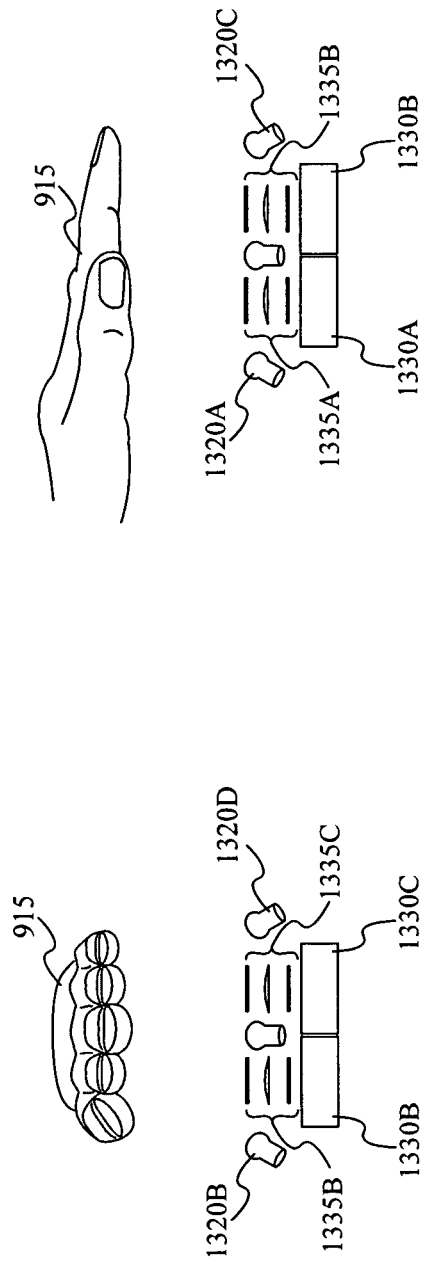
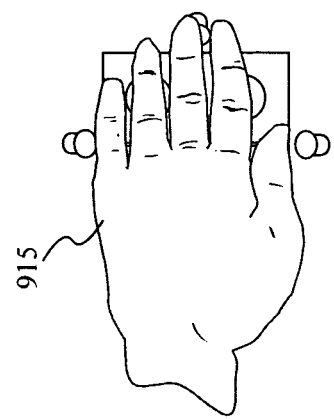
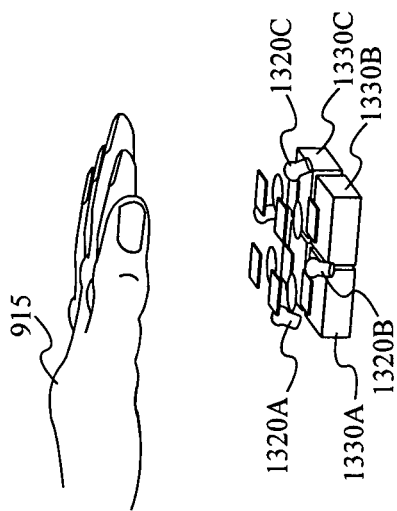
FIG. 13A
FIG. 13B
FIG. 13C
FIG. 13D

WHOLE-HAND MULTISPECTRAL BIOMETRIC IMAGING

CROSS-REFERENCES TO RELATED APPLICATIONS

This application is a non-provisional, and claims the benefit, of commonly assigned U.S. Provisional Application No. 60/943,207, filed Jun. 11, 2007, entitled "Contactless Multispectral Biometric Capture," the entirety of which is herein incorporated by reference for all purposes.

This application is a continuation-in-part of U.S. patent application Ser. No. 12/100,597, filed Apr. 10, 2008, entitled "Biometric Detection Using Spatial, Temporal, And/Or Spectral Techniques," which is a nonprovisional, and claims the benefit, of U.S. Provisional Patent Application No. 60/911,007, filed Apr. 10, 2007, entitled "Spatial And Temporal Biometric Detection," the entire disclosure of each of which is incorporated herein by reference for all purposes.

This application is a continuation-in-part of U.S. patent application Ser. No. 11/779,998, filed Jul. 19, 2007, entitled "Multibiometric Multispectral Imager," which is a nonprovisional, and claims the benefit, of U.S. Provisional Patent Application No. 60/832,233, filed Jul. 19, 2006, entitled "Whole-Hand Multispectral Imager," the entire disclosure of each of which is incorporated herein by reference for all purposes.

GOVERNMENT RIGHTS

This invention was made with Government support under Contract W911NF-07-C-0111 awarded by the Army. The Government has certain rights in this invention.

BACKGROUND

This application relates to biometrics. More specifically, this application relates to methods and systems for using a various biometric sensor.

"Biometrics" refers generally to the statistical analysis of characteristics of living bodies. One category of biometrics includes "biometric identification," which commonly operates under one of two modes to provide automatic identification of people or to verify purported identities of people. Biometric sensing technologies measure the physical features or behavioral characteristics of a person and compare those features to similar prerecorded measurements to determine whether there is a match. Physical features that are commonly used for biometric identification include faces, irises, hand geometry, vein structure, and fingerprint patterns, which is the most prevalent of all biometric-identification features. Current methods for analyzing collected fingerprints include optical, capacitive, radio-frequency, thermal, ultrasonic, and several other less common techniques.

Most existing fingerprint sensors rely on relatively high-quality contact between the finger and the sensor to obtain images. Obtaining adequate contact is both finicky and time-consuming because of factors related to individual characteristics of users of the sensors, the quality of the skin, and environmental variability. For some individuals and under some circumstances, achieving adequate contact is impossible. Ease of consistent fingerprint capture limits the effectiveness and scope of applications that utilize fingerprint biometrics for identity management. Furthermore, in some cultures and during specific public health events, there is a negative perception of contact-based fingerprinting. This was the case, for instance, during the SARS outbreak in 2003.

Contact measurement is a fundamental requirement for many forms of fingerprint acquisition, such as optical total internal reflectance, RF, capacitance, thermal, and ultrasound techniques. There have been a small number of fingerprint sensors that have been developed and marketed as "noncontact" fingerprint sensors. In many cases, these sensors use a pedestal or some other device to locate and stabilize the finger. Thus, although the fingerprint region is not in contact with the sensor, other portions of the finger are contacting the sensor, which compromises the advantages that a true non-contact fingerprint sensor would embody.

Most existing fingerprint sensors are also susceptible to being defeated through the use of artificial or altered fingerprint samples. Although each fingerprint technology may be susceptible to only specific types of artificial (or "spoof") samples, the effort required to spoof most systems is fairly modest one the "trick" for doing so is known.

BRIEF SUMMARY

A biometric system is disclosed according to some embodiments. The biometric system includes one or more illumination sources, a first imager, a second imager and an analyzer. The one or more illumination sources may be configured to illuminate at least a portion of a target space. The target space may be located within free space, in some embodiments, and/or defined partially be a platen or other mechanical device, in other embodiments. In other embodiments, the target space is configured to receive a human hand. The first imager may be configured to receive light from at least a portion of the target space under a first optical condition. The second imager may be configured to receive light from at least a portion of the target space under a second optical condition. The first optical condition is distinct from the second optical condition. The analyzer may be communicatively coupled with the one or more illumination sources and the plurality of imagers. The analyzer may also be configured to control the operation of the one or more illumination sources, the first imager, and the second imager in order to produce a multispectral image of an object placed within the target space from the light received at first imager and the second imager. The first imager and the second imager may be controlled by the analyzer, in one embodiment, to imager the target space substantially simultaneously.

In various embodiments, the first imager is configured to receive light from a first subspace of the target space and the second imager is configured to receive light from a second subspace of the target space. In other embodiments, the first imager is focused at a first focal plane and the second imager is focused at a second focal plane, wherein the first focal plane and the second focal plane are distinct. In other embodiments, the biometric system may include a first processor coupled with the first imager and a second processor coupled with the second imager. In other embodiments, the biometric system includes a user interface configured to substantially indicate at least a portion of the target space to a user. In other embodiments, the biometric system includes a presence detector and/or proximity detector configured to detect the presence of an object within the target space and/or the proximity of an object relative to the target space.

A method for collecting a multispectral biometric image is disclosed according to various embodiments. At least a portion of a target space is illuminated. The illumination may include various illumination techniques, illumination conditions, and/or illumination sources. Light is received from at least a portion of the target space under a first optical condition. Light is also separately received from at least a portion of the target space under a second optical condition substantially simultaneously as light is received from the target space under the first optical condition. The first optical condition and the second optical condition, in some embodiments, are distinct. A multispectral image of an object within the target space may be derived from the light received under either or both of the first optical condition and the second optical condition.

In some embodiments, an indication of at least a portion of the target space is provided. In other embodiments the presence of an object within the target space is detected. In other embodiments, the first optical condition and the second optical condition are selected from the group consisting of polarized light, total internally reflected light, light with a specific wavelength, light within a specific wavelength band, light from a subspace within the target space, and/or light from a focal plane within the target space. In other embodiments, a first imager provides a first image of at least a portion of the target space under the first optical condition and a second imager provides a second image of at least a portion of the target space under the second optical condition. In another embodiment, the first image has a resolution greater than the resolution of the second image.

Another biometric system is disclosed according to various embodiments. An illumination means for illuminating a target space is included. A first imaging means for imaging at least a portion of the target space under a first optical condition and providing a first image may also be included. A second imaging means for imaging at least a portion of the target space under a second optical condition distinct from the first optical condition and providing a second image may also be provided. A processing means for controlling the illumination means, the first imaging means and the second imaging means is also provided. The processing means may be configured to derive a multispectral image from the first image and the second image.

Presence sensing means may also be included in some embodiments, for sensing the presence of an object within at least a portion of the target space. In other embodiment the first optical condition and the second optical condition may be selected from the group consisting of polarized light, total internally reflected light, light with a specific wavelength, light within a specific wavelength band, light from a subspace within the target space, and/or light from a focal plane within the target space. In yet other embodiments an indication means for indicating at least a portion of the target space to a user is included.

A whole-hand biometric sensor is also provided according to various embodiments. The whole-hand biometric sensor includes a platen, one or more illumination sources, a first imager, a second imager and an analyzer. The platen may be configured to receive a human hand and/or include a surface that defines a target surface. The one or more illumination sources may be configured to illuminate at least a portion of the target surface. The first imager may be configured to receive light from at least a portion of the target surface under a first optical condition. The second imager may be configured to receive light from at least a portion of the target surface under a second optical condition. The first optical condition may be distinct from the second optical condition. The analyzer may be communicatively coupled with the one or more illumination sources and the plurality of imagers. The analyzer may also be configured to control the operation of the one or more illumination sources, the first imager, and the second imager in order to produce a multispectral image of an object placed on the target surface from the light received at first imager and the second imager.

In various other embodiments, the analyzer may be configured to control the first imager and the second imager to provide images substantially simultaneously. In other embodiments, the first imager may be configured to image a first spatial location on the target surface and the second imager may be configured to image a distinct second spatial location on the target surface. Either or both of the first imager and the second imager may include one or more optical elements selected from the list consisting of a color filter, a color filter array, a linear polarizer, a circular polarizer, a diffuser, a collimator, a gratings, and a lens. The first imager may be focused at a first focal plane and the second imager may be focused at a second distinct focal plane. Other embodiments include a first processor coupled with the first imager and a second processor coupled with the second imager. A user interface configured to substantially indicate at least a portion of the target space to a user may also be included according to various other embodiments. A presence and/or proximity detector configured to detect the presence and/or proximity of an object within and/or relative to the target space.

A method for collecting a multispectral biometric image of a human hand is also disclosed according to various embodiments. At least a portion of a target surface of a platen is illuminated with one or more light sources of various types and/or configurations. Light may be received from at least a portion of the target surface under a first optical condition. Light may be separately received from at least a portion of the target surface under a second optical condition substantially simultaneously as the light is received the target surface under a first optical condition. The first optical condition and the second optical condition may be distinct. A multispectral image of an object within the target surface may be derived from the light received under either or both of the first optical condition and the second optical condition.

In various embodiments the first optical condition and the second optical condition may be selected from the group consisting polarized light, total internally reflected light, light with specific wavelength, light within a specific wavelength band, light from a first subspace within the target space, and/or light from a first focal plane within the target space. In some embodiments the first imager provides a first image of at least a portion of the target space under the first optical condition and/or the second imager provides a second image of at least a portion of the target space under the second optical condition. In other embodiments the first image has a resolution greater than the resolution of the second image.

Another biometric system is disclosed according to various embodiments that includes illumination means for illuminating a target space, a first imaging means, a second imaging means and processing means. The first imaging means adapted for imaging at least a portion of the target space under a first optical condition and providing a first image. The second imaging means adapted for imaging at least a portion of the target space under a second optical condition distinct from the first optical condition and providing a second image. The processing means adapted for controlling the illumination means, the first imaging means and the second imaging means. The processing means may be configured to derive a multispectral image from the first image and the second image. Presence sensing means for sensing the presence of an object within at least a portion of the target space may also be included in various embodiments. In other embodiments, the first optical condition and the second optical may be selected from the group consisting polarized light, total internally reflected light, light with specific wavelength, light within a specific wavelength band, light from a first subspace within the target space, and/or light from a first focal plane within the target space.

A biometric system is disclosed according to one embodiment that includes one or more illumination sources, a plurality of imagers and an analyzer. The one or more illumination sources are configured to illuminate a target space, wherein the target space is located in free space or relative to a platen. The plurality of imagers are configured to receive light from the target space under multispectral conditions. Each imager is configured to receive light from the target space under different multispectral conditions. The different multispectral conditions may include differences in illumination wavelength or wavelengths, differences in imaging wavelength or wavelengths, differences in illumination angle, differences in imaging angle, differences in imaging resolution, differences in spatial coverage, and/or differences in focal plane. The analyzer may be communicatively coupled with the one or more illumination sources and the plurality of imagers. The analyzer may also be configured to control the operation of the one or more illumination sources and/or the plurality of imagers in order to produce one or more multispectral image of an object placed within the target space from the light received at any or all the imagers. The system may also include a plurality of processors, such that each imager is coupled with a processor.

A biometric system is disclosed according to one embodiment that includes one or more illumination sources, a first and a second imager, and an analyzer. The one or more illumination sources may be configured to illuminate a target space. The first imager receives light from a first subspace of said target space under a multispectral condition. The second imager receives light from a second subspace of said target space under a different multispectral condition. The first imager and the second imager receive light substantially simultaneously. The analyzer may be communicatively coupled with the one or more illumination sources, the first imager, and the second imager. The analyzer may be configured to control the operation of the one or more illumination sources, the first imager, and the second imager in order to derive a multispectral image of an object placed within the target space from light received at either or both of the first imager and the second imager.

A method for collecting a biometric image is provided according to another embodiment. A target space is illuminated with one or more illumination sources. Light is received from a first subspace of said target space with a first imager. Light is received from a second subspace of said target space with a second imager. A multispectral image is derived with at least a portion of an object within said target space from the light received at either or both of the first imager and the second imager.

A biometric system is disclosed according to one embodiment. The biometric system includes a platen, one or more illumination sources, a first imager, a second imager and an analyzer. The platen may be adapted for placement of a purported skin site by an individual. The one or more illumination sources may be configured to illuminate the skin site. The first imager may be configured to receive light from a first zone of said skin site under a multispectral conditions. The second imager configured to receive light from a second zone of said skin site under another multispectral conditions. The analyzer may be communicatively coupled with the one or more illumination sources, the first imager, and the second imager. The analyzer may be configured to control the operation of the one or more illumination sources, the first imager, and the second imager in order to derive a multispectral image of the skin site from light received at either or both of the first imager and the second imager.

A biometric system is disclosed according to another embodiment, that includes one or more illumination sources, a plurality of imagers and an analyzer. The one or more illumination sources may be configured to illuminate a target space. The plurality of imagers may be configured to receive light from the target space under multispectral conditions. At least one imager receives light with a multispectral condition distinct from the multispectral condition received with at least one other imager. The analyzer may be communicatively coupled with the one or more illumination sources and the plurality of imagers. The analyzer may be configured to control the operation of the one or more illumination sources and the plurality of imagers in order to produce a multispectral image of an object placed within the target space from the light received at any or all the imagers.

A biometric system is disclosed according to one embodiment, that includes one or more illumination sources, a first imager, a second imager, and an analyzer. The one or more illumination sources may be configured to illuminate a target space. The first imager may be configured to receive light from said target space under a first optical condition. The second imager may be configured to receive light from said target space under a second optical condition. The analyzer may be communicatively coupled with the one or more illumination sources, the first imager, and the second imager. The analyzer may be configured to control the operation of the one or more illumination sources, the first imager, and the second imager in order to derive a multispectral image of an object placed within the target space from light received at either or both of the first imager and the second imager.

A method for collecting a biometric image is disclosed according to another embodiment. A target space is illuminated. Light is received from the target space under a first optical condition. Light is received from the target space under a second optical condition. A multispectral image of an object within said target space is derived from the light received under the first optical condition and/or the second optical condition. The first and/or second optical condition may include illumination wavelength or wavelengths, imaging wavelength or wavelengths, illumination angle, imaging angle, imaging resolution, spatial coverage, and/or focal plane.

A contactless biometric system is provided according to one embodiment. The contactless biometric system may include one or more illumination sources, one or more imagers and an analyzer. The one or more illumination sources may be configured to illuminate a target space located in free space. The one or more imagers may be configured to collect light from at least a portion of the target space under different multispectral conditions. The analyzer may be configured to communicatively coupled with the one or more illumination sources and the one or more imagers. The analyzer may be configured to control the operation of the one or more illumination sources and the one or more imagers in order to derive a multispectral image of an object placed within the target space and imaged by the one or more imagers.

A method for collecting a biometric image is provided according to another embodiment. The presence of an object is detected within a target space located in free space. The object is illuminated within the target space with one or more illumination sources. Light is received from the target space at one or more imagers with different optical conditions. A multispectral image of the object within said target space is derived from the light received at the one or more imagers.

A contactless biometric system is provided according to another embodiment that includes an illumination subsystem, an imaging subsystem, sensing means, and an analyzer. The illumination subsystem may be disposed to illuminate a predetermined spatial location in free space. The imaging subsystem may be disposed to collect light emanating from the predetermined spatial location. The sensing means may be configured to sense when a purported skin site is placed substantially within the predetermined spatial location. The analyzer may be in communication with the illumination subsystem, the imaging subsystem, and the sensing subsystem. The analyzer may comprises instructions to operate the illumination subsystem, the imaging subsystem, and the sensing subsystem to derive a multispectral image of an object placed within the target space and imaged by the one or more imagers.

A method for collecting a biometric image is provided according to one embodiment. An indication of the proximate location of a target space in free space is provided. An object within the target space is illuminated with one or more illumination sources. Light from the target space is received at one or more imagers under multispectral conditions and/or different optical conditions. A multispectral image of the object within said target space may be derived from the light received at the one or more imagers.

A biometric system is disclosed according to another embodiment that includes conveying means, illuminating means, imaging means, and logic means. The conveying means for conveying an indication of the proximate location of a target space in free space. The illuminating means for illuminating at least a portion of the target space. The imaging means for receiving light from the target space under multispectral conditions. The logic means for deriving a multispectral image of an object within said target space from the light received by the imaging means.

A biometric system is disclosed according to one embodiment that includes a platen, one or more illumination sources, a first imager, a second imager and an analyzer. The platen may be configured to receive a human hand. The one or more illumination sources may be configured to illuminate a hand placed on the platen. The first imager may be configured to receive light from a first portion of the hand under multispectral conditions. The second imager may be configured to receive light from a second portion of the hand under multispectral conditions. The an analyzer may be communicatively coupled with the one or more illumination sources, the first imager, and the second imager. The analyzer may be configured to control the operation of the one or more illumination sources, the first imager, and the second imager in order to derive a multispectral image of the first portion of the hand from light received at first imager and derive a multispectral image of the second portion of the hand from light received at second imager. In another embodiment, a single multispectral image may be derived at the analyzer from the light received at both the first and second imagers.

A biometric system is disclosed according to one embodiment, that includes one or more illumination sources, a plurality of images, and an analyzer. The one or more illumination sources may be configured to illuminate a hand placed substantially within target space in free space. The plurality of imagers may be configured to receive light from portions of a hand placed substantially within the target space under multispectral conditions. The analyzer may be communicatively coupled with the one or more illumination sources and the plurality of imagers. The analyzer may be configured to control the operation of the one or more illumination sources and the plurality of imagers in order to derive a multispectral image of the portions of the hand from light received at the plurality of imagers.

A method for collecting a biometric image of a hand is also provided according to one embodiment. A target space located in free space is provided for the placement of a human hand by an individual. A hand within the target space may be illuminated using one or more illumination sources. Light from the hand may be received under multispectral conditions using one or more imagers. At least one multispectral image of at least one portion of the hand within the target space is derived from the received light.

Embodiments described herein provide a contactless biometric system. The system comprises an illumination subsystem, an imaging subsystem, a three-dimensional sensing subsystem, and an analyzer. The illumination subsystem is disposed to illuminate a predetermined spatial location in free space. The imaging subsystem is disposed to collect light emanating from the predetermined spatial location. The three-dimensional sensing subsystem is configured to sense when an object is substantially in the predetermined spatial location. The analyzer is provided in communication with the illumination subsystem, the imaging subsystem, and the three-dimensional subsystem. The analyzer comprises instructions to operate the subsystems to collect substantially simultaneously a plurality of images of the object disposed at the predetermined spatial location under multispectral conditions.

In some embodiments, the illumination subsystem comprises a light-emitting diode. In some cases, the light-emitting diode may comprise a white-light emitting diode. In some embodiments, the illumination subsystem comprises multiple light-emitting diodes. In some cases a plurality of light emitting diodes may emit light that is substantially monochromatic. Such a plurality of light-emitting diodes may comprise light-emitting diodes with substantially different wavelength characteristics. A polarizer may also be disposed to polarize light emanating from the light-emitting diode.

The imaging subsystem may comprise a plurality of imagers oriented and focused on the predetermined spatial location. Optical filters may be disposed to filter the wavelengths of light collected by at least one of the plurality of imagers. At least one of the plurality of imagers may incorporate a color filter array. A polarizer may be disposed to polarize light collected by at least one of the plurality of imagers.

The three-dimensional sensing subsystem may comprise a plurality of coherent illuminators that are oriented to overlap at the predetermined spatial location.

BRIEF DESCRIPTION OF THE DRAWINGS

A further understanding of the nature and advantages of the present invention may be realized by reference to the remaining portions of the specification and the drawings, wherein like reference labels are used throughout the several drawings to refer to similar components.

FIGS. 8A, 8B, 8C and 8D illustrate various views of a multispectrally modular, contactless biometric sensor apparatus with imagers that focus on different imaging planes according to one embodiment.

FIGS. 13A, 13B, 13C and 13D illustrate various views of a multispectrally and/or spatially modular contactless biometric sensor apparatus according to one embodiment.

DETAILED DESCRIPTION

Figure 1:
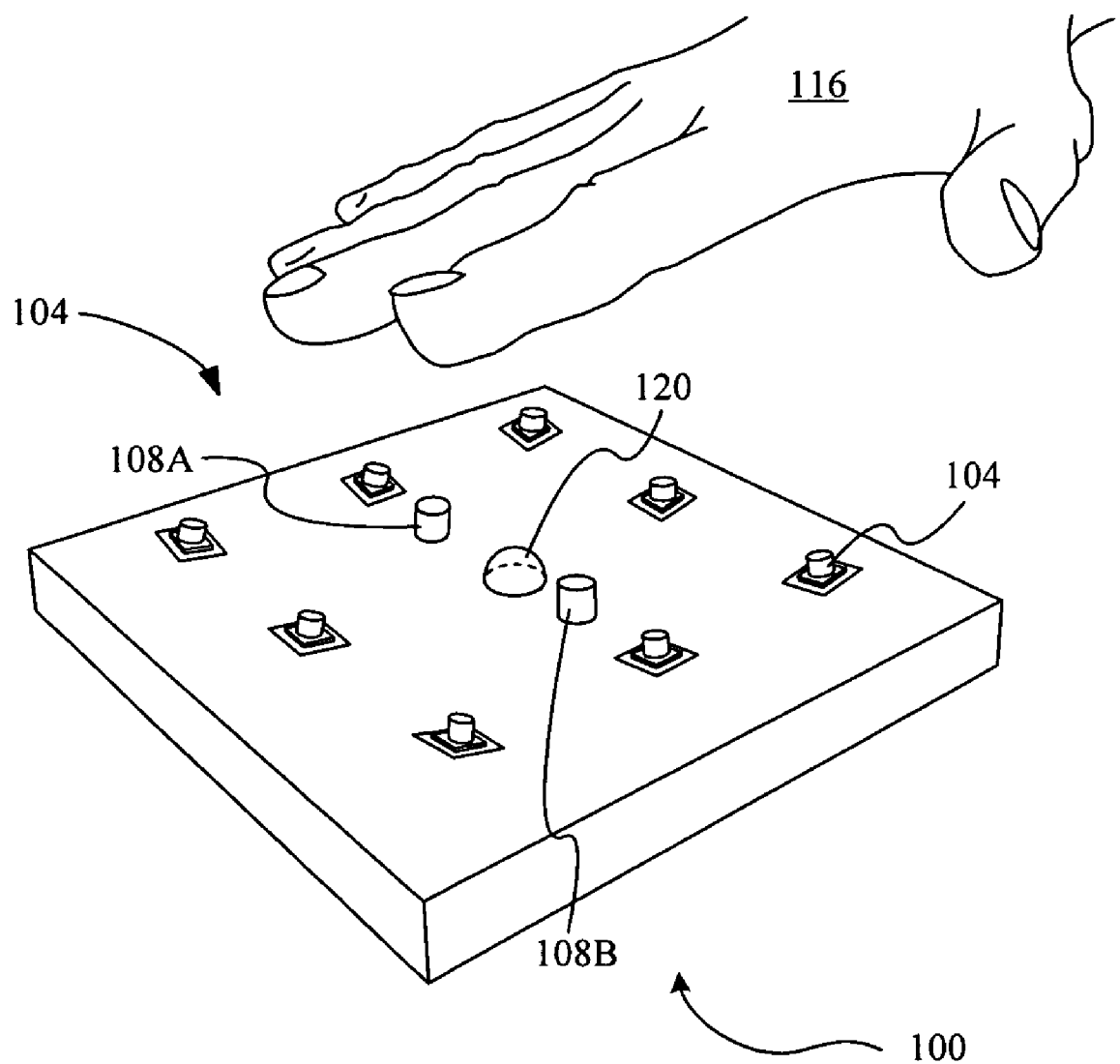
FIG. 1 illustrates a structure that may be used for a contactless biometric sensor in one embodiment.

A detailed description is provided below of examples of multispectral systems that may accordingly be used in embodiments, but such a description is not intended to be limiting since other techniques may be used in alternative embodiments.

Overview

Embodiments disclosed herein provide methods and systems that allow for the collection and processing of biometric measurements. These biometric measurements may provide strong assurance of a person's identity, as well as of the authenticity of the biometric sample being taken. Such embodiments, for example, may be incorporated within a number of different types of devices, such as cellular telephones, personal digital assistants, laptop computers, and other portable electronic devices, as well as stand-alone devices for physical or logical access. The common characteristic of the methods and systems is the application of multiple distinct optical configurations used to collect a plurality of image data during a single illumination session, often the images are collected simultaneously. In some embodiments, the images are collected of a finger or a hand with or without a platen. In some instances, methods and systems are provided for the collection and processing of data using a sensor with two or more distinct imagers. In other instances, the methods and systems disclosed pertain to data collected using a sensor with a single camera or multiple cameras. Other embodiments methods and systems are provided for spatially and multispectrally modular imaging and imaging systems.

The sensors may provide for an information-rich dataset that results in increased security and usability relative to conventional sensors. The increased security derives from combining information from multiple images that represent distinct optical characteristics of the material being measured. These characteristics provide sufficient information to be able to distinguish between living human skin and various artificial materials and methods that might be used to attempt to spoof the sensor. As well, increased security is derived from the aspect that provides a mechanism to perform measurements across a wide range of environmental and physiological effects. The robust and reliable sampling means that system security standards do not have to be relaxed to compensate for poor image quality.

Enhanced sensor usability is achieved by reducing the constraints on the individual for precise contact and/or positioning, as well as the requirement that the individual's skin has particular qualities. Moreover, embodiments also rely on contactless systems. As well, the ability to extract subsurface biometric information from images collected under certain optical conditions provides a mechanism for performing biometric determinations even in those cases where the surface features are missing or damaged. In this way, the multispectral measurements made in embodiments are advantageously robust to non-ideal skin qualities, such as dryness, excess wetness, lack of resilience, and/or worn features such as are typically associated with the elderly, those who perform significant manual labor, or those whose skin is exposed to chemicals, such as hairdressers or nurses.

The set of all images collected under a plurality of distinct optical conditions and/or during a single illumination session is referred to herein as "multispectral data." The different optical conditions may include differences in polarization conditions, differences in illumination angle, differences in imaging angle, differences in color filter array characteristics, differences in resolution, differences in focal planes, differences in spatial coverage, and/or differences in illumination wavelength or wavelengths. In some optical conditions the resulting images are significantly affected by the presence and distribution of TIR phenomena at the interface between the sample and a platen. These images are referred to herein as "TIR images." In some optical conditions, the resulting images are substantially unaffected by the presence or absence of TIR effects at a platen. These images are referred to herein as "direct images." Some embodiments provide images that are taken without a platen, support (for example, the support described in U.S. Pat. No. 6,404,904), contact point, mechanical positioning device, mechanical alignment device, prop, etc. These images are referred to herein as "contactless images." Contactless images are created without physical contact between the skin site and the imaging device, biometric sensor, and/or any accessory thereof.

Skin sites applicable to the multispectral measurements described herein include all surfaces and all joints of the fingers and thumbs, the fingernails and nail beds, the palms, the front of a hand or hands, the back of a hand or hands, the wrists and forearms, the face, the eyes, the ears, and all other external surfaces of the body. While the discussion below sometimes makes specific reference to "fingers" or "hands" in providing examples of specific embodiments, it should be understood that these embodiments are merely exemplary and that other embodiments may use skin sites at other body parts.

In some embodiments, a sensor provides a plurality of discrete wavelengths of light that penetrate the surface of the skin, and scatter within the skin and/or underlying tissue. As used herein, reference to "discrete wavelengths" is intended to refer to sets of wavelengths or wavelength bands that are treated as single binned units—for each binned unit, information is extracted only from the binned unit as a whole, and not from individual wavelength subsets of the binned unit. In some cases, the binned units may be discontinuous so that when a plurality of discrete wavelengths are provided, some wavelength between any pair of the wavelengths or wavelength bands is not provided, but this is not required. In some instances, the wavelengths are within the ultraviolet—visible—near-infrared wavelength range.

A portion of the light scattered by the skin and/or underlying tissue exits the skin and is used to form an image of the structure of the tissue at or below the surface of the skin. In some embodiments, such an image may include a fingerprint and/or hand image, where the term "fingerprint" is used broadly herein to refer to any representation of any skin site with dermatoglyphic features.

FIG. 1 shows an example of contactless modular biometric sensor 100 according to embodiments. The biometric sensor 100 includes a plurality of imagers 130 are arranged around a single light source 120 and position sensors 108. A hand 116 placed with a predefined target space located above the biometric sensor 100 may be imaged using the plurality of imagers 104. The position of the hand relative to the biometric sensor 100 may be monitored using the position sensors 108. The position sensors 108 may include stereoscopic light sources, for example laser LEDs, that illuminate the free space, including the target space, above the biometric sensor 100. For example, in conjunction with one or more imagers 104, stereoscopic light sources may provide an indication when the hand is within the target space. The target space may include a volume within free space where an object is substantially in focus at least one imager when the object placed therein. Thus, a target space, in some embodiments, may depend on the characteristics of the imager(s). In one embodiment, an imager may be positioned to image different spatial areas of the hand. In another embodiment, an imager may be positioned to image the same portion of the hand but under different multispectral conditions. In another embodiment, an imager may be positioned to image different focal planes. In another embodiment, an imager may image at substantially the same time. The resultant images may be combined using any function to derive a multispectral image.

Spatially Modular Finger Sensor

Figure 2:
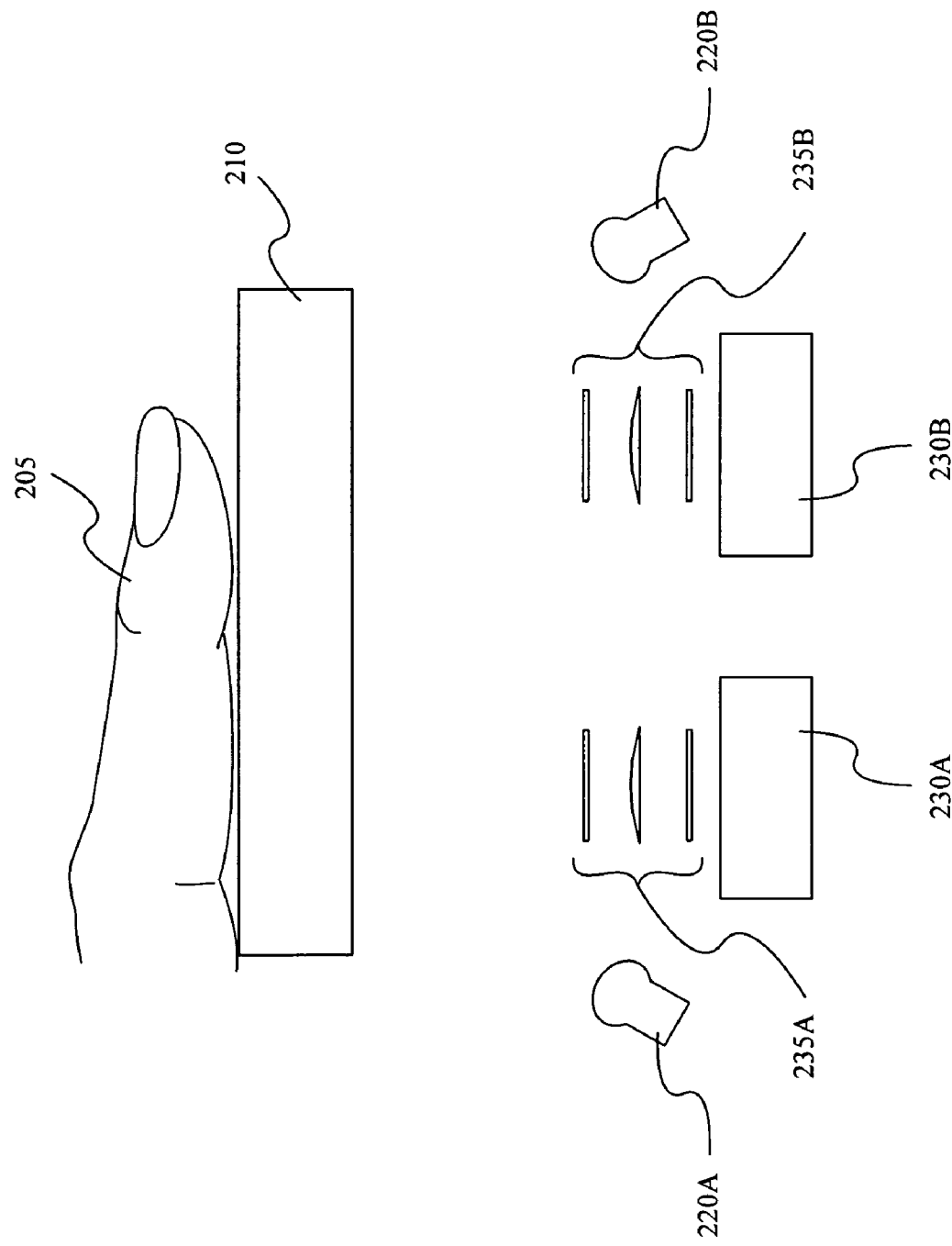
FIG. 2 illustrates a modular biometric sensor according to one embodiment.
Figure 3A:
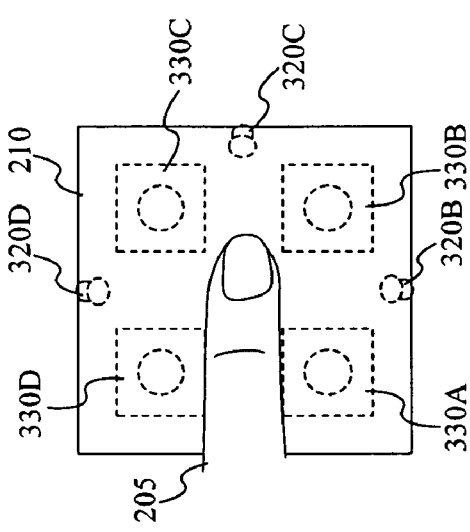
FIGS. 3A, 3B, 3C and 3D illustrate various views of a modular biometric sensor apparatus according to one embodiment.
Figure 3B:
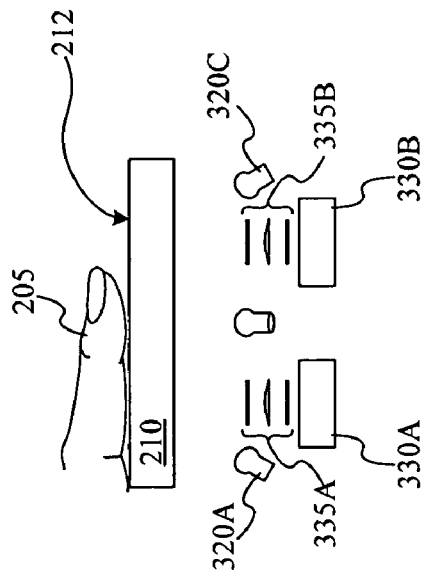
Figure 3C:
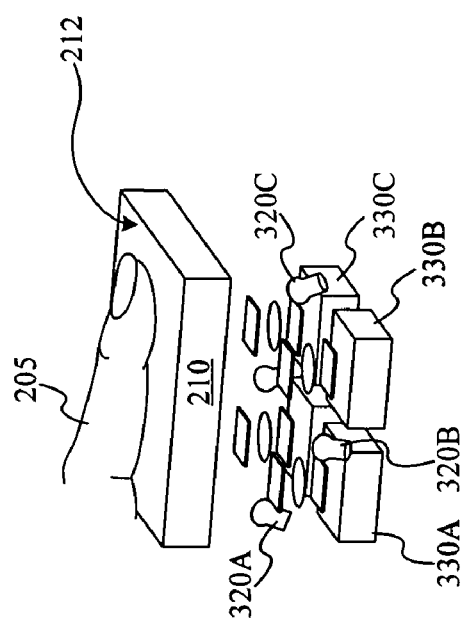
Figure 3D:
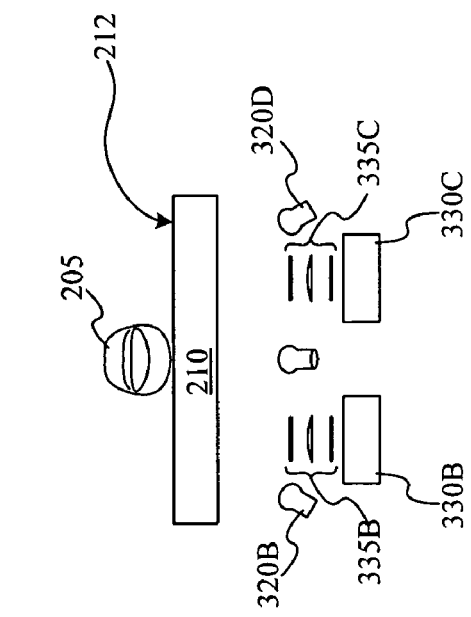

Various embodiments provide for a spatially modular biometric sensing system. As noted above, a multispectral image can be derived from images with different spatial coverage. That is, spatially modular imagers may be used to derive a multispectral image. FIG. 2 shows a spatially modular biometric system according to one embodiment. The system includes two imagers 230. The imagers 230A and 230B may be separated or combined on a single circuit board, for example, as conjoined wafer-level cameras. Each imager may also include various optical elements 235. While three optical elements 235 are shown, any number including zero may be used. At least one illumination source 220 may be used. In this embodiment, two LEDs 220 are used to illuminate the finger 205 on the platen 210. The first imager 230A may receive light from a first portion of the finger 205. The second imager 230B may receive light from a second portion of the finger 205 placed on the platen 210. The first portion and the second portion may overlap or be completely distinct.

FIGS. 3A, 3B, 3C and 3D illustrate various views of another modular biometric sensor apparatus according to one embodiment. The modular sensor apparatus includes four imagers 330, optical elements 335, and four light sources 320. While four light sources are shown, any number of light sources may be used. For example, a single white light source may be used. Each imager 330 receive light from four subsections of the target area. These subsections may overlap or be distinct. As shown, a finger 205 is placed on the target surface 212 of a platen 210. Each imager may image four different parts of the finger. The imagers 330 may image each subsection substantially simultaneously.

Figure 4B:
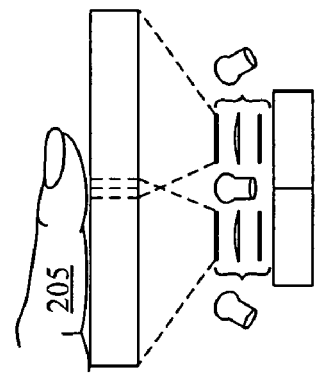
FIGS. 4A, 4B, 4C and 4D illustrate various views of a spatially modular biometric sensor apparatus according to one embodiment.
Figure 4D:
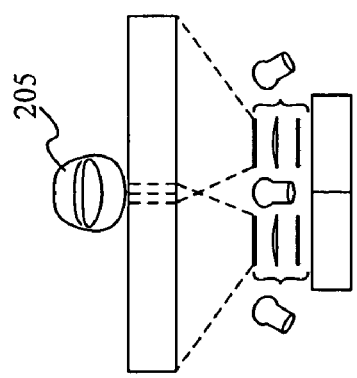
Figure 4A:
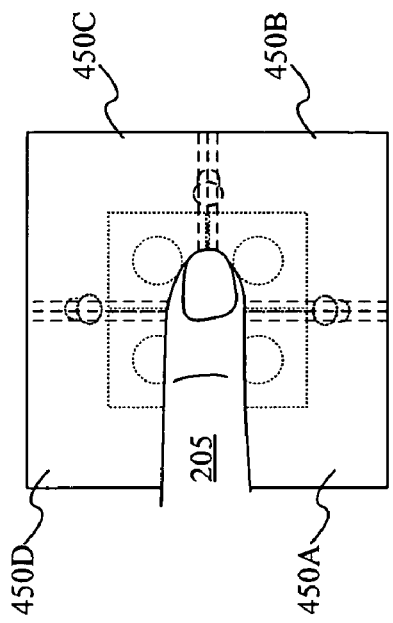
Figure 4C:
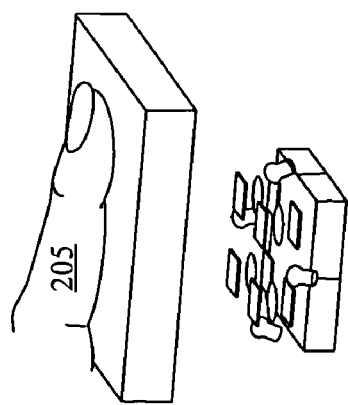

FIGS. 4A, 4B, 4C and 4D illustrate various views of a spatially modular biometric sensor apparatus according to another embodiment. Four imaging subsections 450 are shown in FIGS. 4B, 4C and 4D. Some overlap between the subsections is shown in this embodiment. Subsections without an overlap may also be used according to another embodiment. Such a system may produce four images, like those shown in FIGS. 10A, 10B and 10C.

Figure 5:
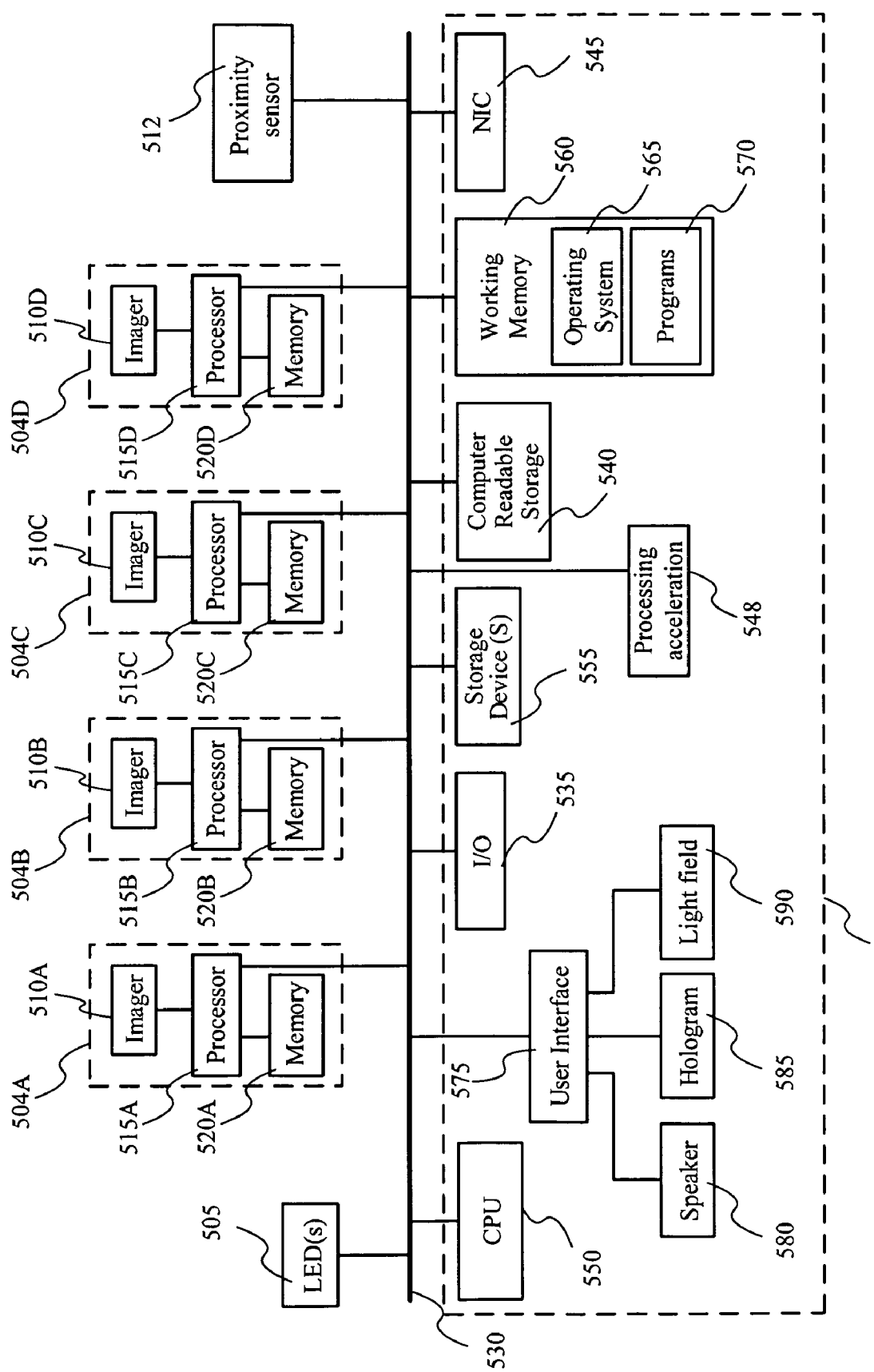
FIG. 5 shows a block diagram of a biometric sensor system according to one embodiment.
Figure 6A:
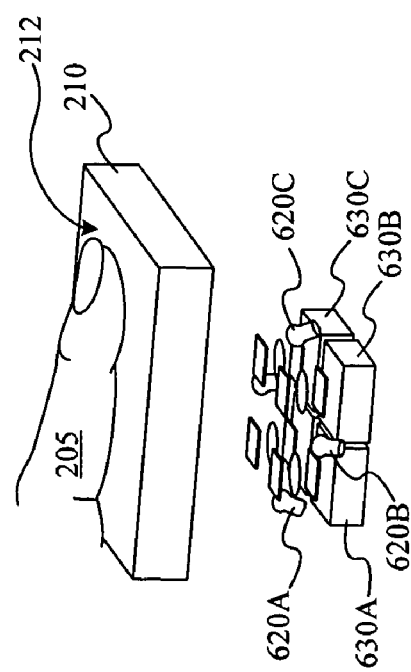
FIGS. 6A, 6B, 6C and 6D illustrate various views of a multispectrally modular biometric sensor apparatus according to one embodiment.
Figure 6B:
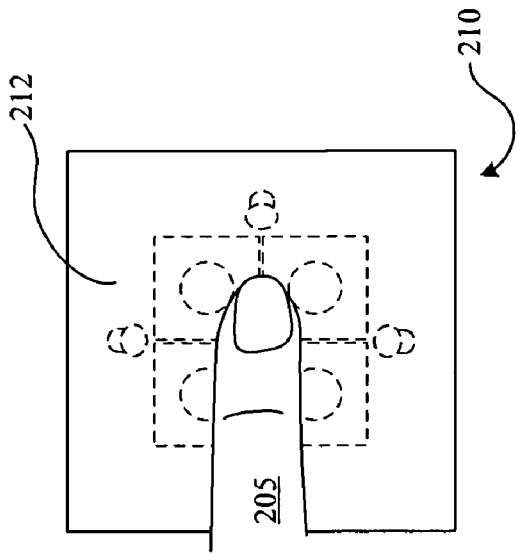
Figure 6C:
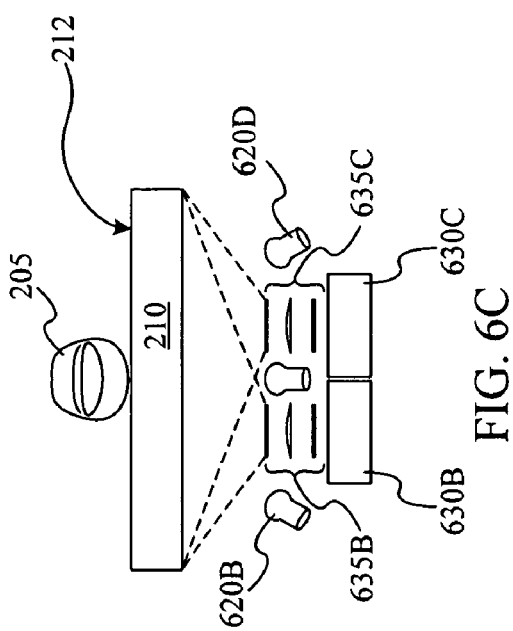
Figure 6D:
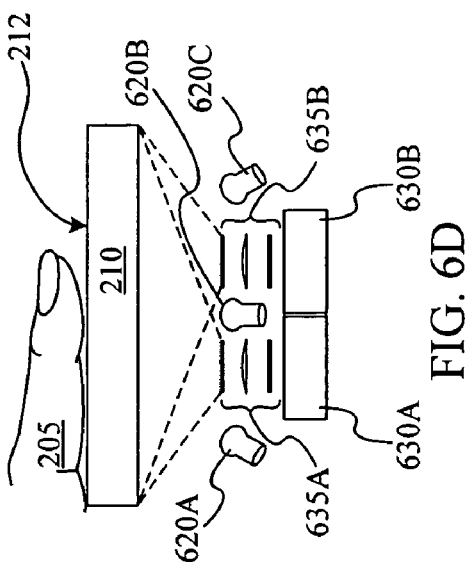
Figure 7B:
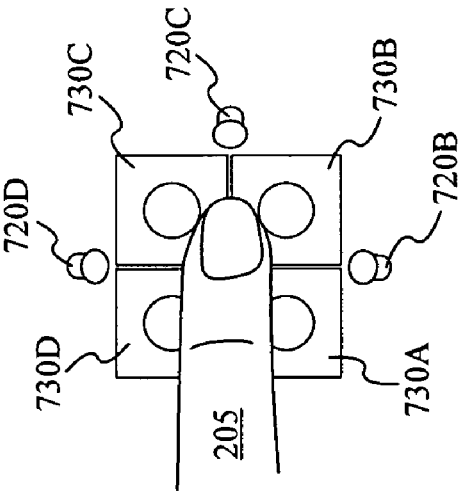
FIGS. 7A, 7B, 7C and 7D illustrate various views of a contactless biometric sensor apparatus according to one embodiment.
Figure 7D:
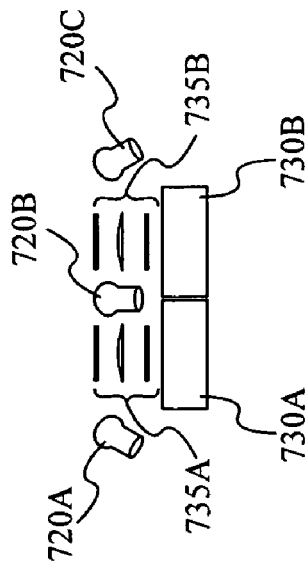
Figure 7A:
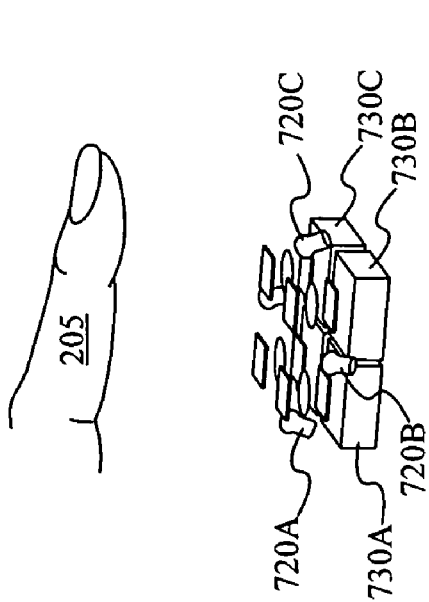
Figure 7C:

FIG. 5 shows a block diagram of a biometric sensor system 500 including a computational device and peripheral devices according to one embodiment. The figure broadly illustrates how individual system elements may be implemented in a separated or more integrated manner. Moreover, the drawing also illustrates how each of the four imagers 510 may include a dedicated processor 515 and/or dedicated memory 520. Each dedicated memory 520 may include operational programs, data processing programs, and/or image processing programs operable on the dedicated processors 515. For example, the dedicated memory 520 may include programs that control the dedicated imager 510 and/or provide image processing. The computational device 502 is shown comprised of hardware elements that are electrically coupled via bus 530. The bus 530, depending on the configuration, may also be coupled with the one or more LED(s) 505, a proximity sensor (or presence sensor) 512 and four imaging subsystems 504 according to various embodiments. In another embodiment, imager memory 520 may be shared amongst imagers 515 and/or with the computational device 502.

In such embodiments, an imaging subsystem may include an imager 510, a processor 515, and memory 520. In other embodiments, an imaging subsystem 504 may also include light sources and/or optical elements. Imaging subsystems 504 may be modular and additional imaging subsystems may be easily added to the system Thus, biometric sensor subsystems may include any number of imaging subsystems 504. The various imaging subsystems, in one embodiment, may be spatially modular in that each imaging subsystem is used to image a different spatial location. The various imaging subsystems, in another embodiment, may be multispectrally modular in that each imaging subsystem is used to image a different multispectral condition. Accordingly, in such an embodiment, an imaging subsystem 504 may also include various optical elements such as, for example, color filter arrays, color filters, polarizers, etc., and/or the imager 510 may be placed at various angles relative to the imaging location. The various imaging subsystems, in another embodiment, may provide focus modularity in that each imaging subsystem is used to image a different focal point or focal plane.

The hardware elements may include a central processing unit (CPU) 550, an input/output device(s) 535, a storage device 555, a computer-readable storage 540, a network interface card (NIC) 545, a processing acceleration unit 548 such as a DSP or special-purpose processor, and a memory 560. The computer-readable storage 540 may include a computer-readable storage medium and a computer readable medium reader, the combination comprehensively representing remote, local, fixed, and/or removable storage devices plus storage media for temporarily and/or more permanently containing computer-readable information. The NIC 545 may comprise a wired, wireless, modem, and/or other type of interfacing connection and permits data to be exchanged with external devices.

The biometric sensor system 500 may also comprises software elements, shown as being currently located within working memory 560, including an operating system 565 and other programs and/or code 570, such as a program or programs designed to implement methods described herein. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Multispectrally Modular Finger Sensor

FIGS. 6A, 6B, 6C and 6D illustrate various views of a multispectrally modular biometric sensor apparatus according to one embodiment. As shown in this embodiment, each of the four imagers 630, in conjunction with optional optical elements 635, image most, if not all of the target area 212 where the finger 205 is located on the platen 210. The imagers 630 may image the target area 212 substantially simultaneously. The imagers 630, in this embodiment, may record images under various multispectral conditions, such as, for example, distinct polarization, distinct imaging angle, distinct wavelength or wavelengths, TIR conditions, distinct resolution, distinct focal planes, distinct spatial coverage, color filter array filtering, etc. For example, a first imager 630A may be associated with a linear polarizing optical element 635A. A second imager 630B may be a high resolution imager 635B that images, for example, with a resolution greater than 200 dots per inch. A third imager 630C may be associated with a Bayer filter as an optical element 635C. A fourth imager may be associated with a blue color filter optical element 635D. While the imagers 630 and the associated optical elements 635 are shown in the figure relatively close together, relatively coplanar and relatively parallel with the platen, one or more imagers and the associated optical elements may be located at an angle relative to the platen 210 and/or target area 212 in one embodiment. Moreover, one or more imagers may be placed in a non-coplanar configuration in another embodiment. Also, in yet another embodiment, one or more imagers may be configured to image light that undergoes total internal reflection at the interface of the finger 205 with the platen target area 212. While four imagers are shown, any number of imagers 630 may be added to the system. Various imagers may provide distinct and/or unique images of the target area under various multispectral optical conditions.

The various imagers may image a finger 205 in the target area 212 substantially simultaneously under the same illumination condition. For example, a while light source or sources may illuminate the finger and each imager may record an image of the finger 205 under various optical conditions. Simultaneous or substantially simultaneous imaging may provide a consistent set of images of the finger 205 that removes, mitigates, or minimizes the affect of any finger jitter, motion, ambient variations, etc., from the various images. Thus, finger characteristics may correspond well from image to image. In one embodiment, the integration time of the imagers, during which an image is recorded, overlap. In another embodiment, the imagers may image at the same time. For example, each frame imaged at a first imager may be synched with a frame at a second imager. In another embodiment, the imagers record an image within less than one second of each other. In another embodiment, the imagers record an image within less than 500 microseconds of each other. In another embodiment, the imagers record an image within less than 100 microseconds of each other.

In another embodiment, the imagers may provide continuous imaging In some embodiments, each imager is synched to image at relatively the same time. For example, the imagers may record images with a video frame rate of 15, 30, 60, or 75 Hz. The imagers may be synched by a clocked signal from a processor and/or clock. If the imagers are properly synched together, a single frame from each imager may be saved into memory that is synched with the frames from the other imagers. For example, the frame may be chosen for storage based on focus, relative location of the skin site, jitter, orientation, contrast, skin site motion, lighting, ambient effects, imager effects, etc. In another embodiment, a set of frames is recorded into memory. A single synched frame may be selected from each imager and used to derive a multispectral image.

Figure 10A:
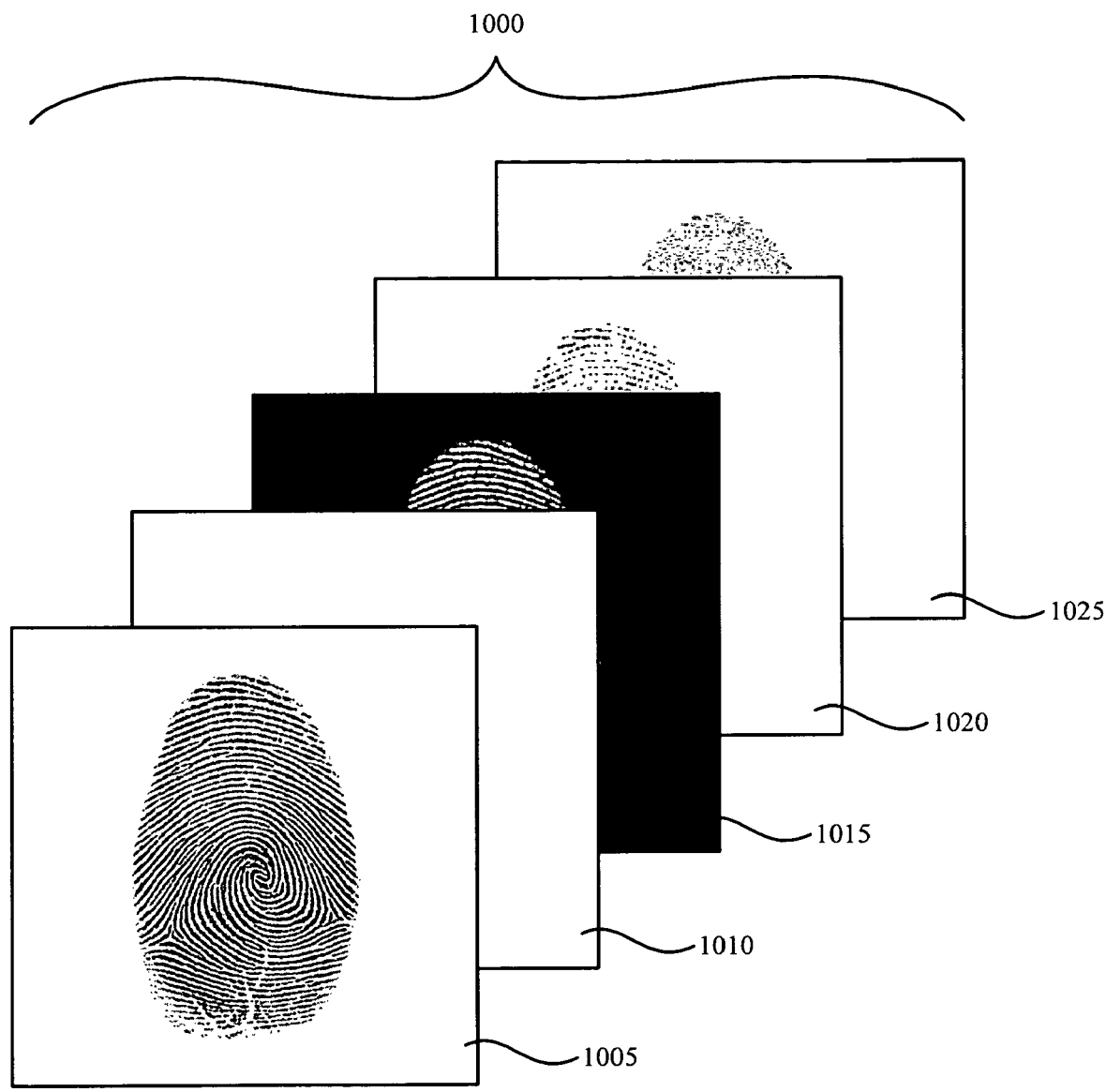
FIG. 10A illustrates a multispectral datacube of a finger generated in accordance with various embodiments.
Figure 10B:
FIG. 10B illustrates four overlapping images of a finger from four spatially modular imagers according to one embodiment.
Figure 10C:
FIG. 10C separately illustrates the four overlapping images in FIG. 10B.
Figure 11B:
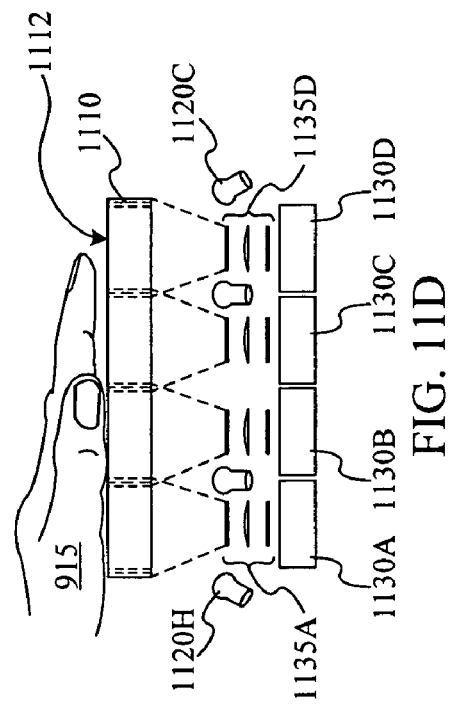
FIGS. 11A, 11B, 11C and 11D illustrate various views of a spatially modular biometric hand sensor apparatus according to one embodiment.
Figure 11D:
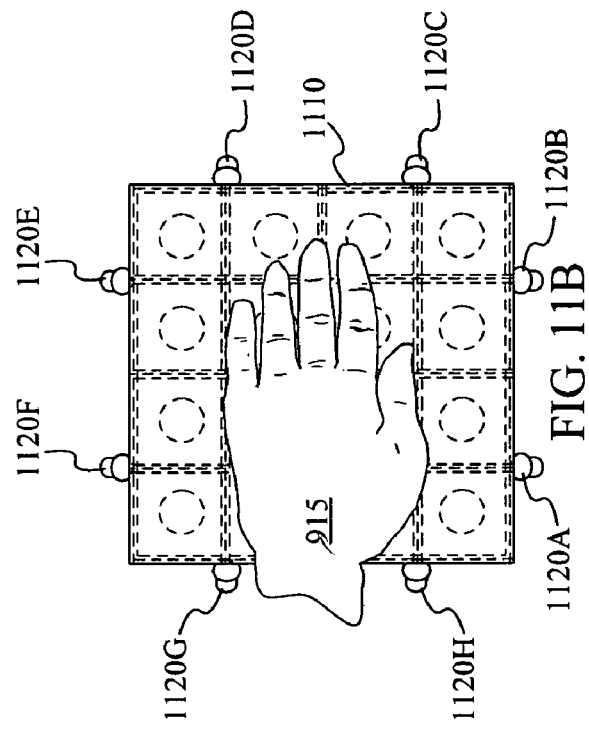
Figure 11A:
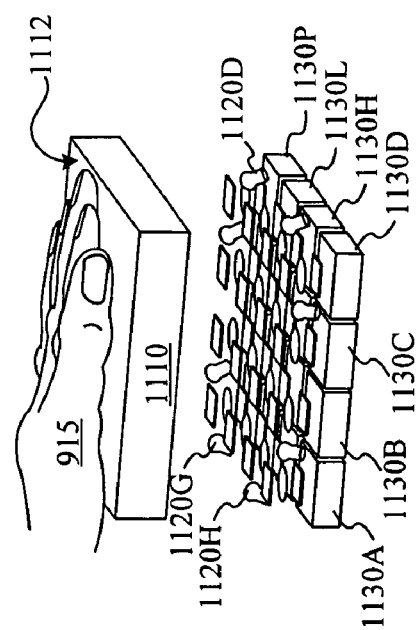
Figure 11C:
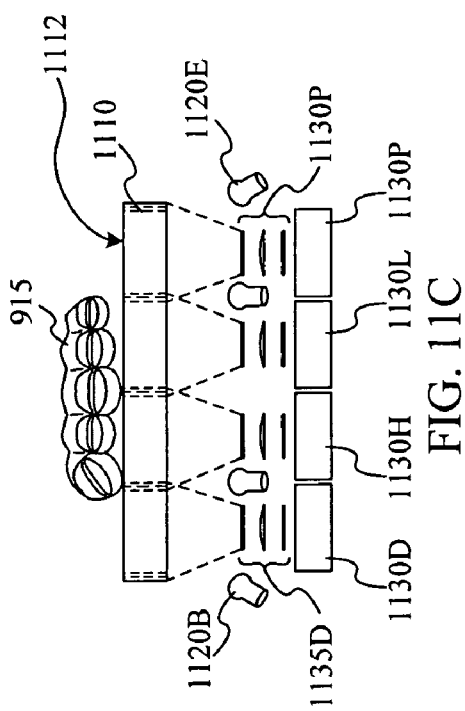

The embodiments described throughout this disclosure may produce a set of images of the finger and/or hand under different optical conditions or produce data from which such a set may be produced using reconstruction techniques. For purposes of illustration, the following discussion is made with reference to such a set of multispectral images, although it is not necessary to produce them for subsequent biometric processing in those embodiments that do not generate them directly. In general, the images collected by the device described in this disclosure may differ in polarization conditions, image angle and location, as well as spectral properties. Furthermore, in the case of a color imager comprised of a color filter array, the color images may be extracted as sub-arrays of the raw pixel values or may be color-interpolated values, as known to one familiar in the art. The images from the plurality of imagers may need to be aligned, tiled, shifted and/or otherwise preprocessed prior to further processing. An illustrative set of aligned and processed multispectral images is shown in FIG. 10A, with the set defining a multispectral datacube 1000.

One way to decompose the datacube 1000 is into images that correspond to each of the multispectral conditions used to image the sample in the measurement process. In the figure, five separate images 10005, 1010, 1015, 1020, and 1025 are shown, corresponding to five discrete multispectral conditions. In an embodiment where visible light is used, the images might correspond, for example, to images generated using light at 450 nm, 500 nm, 550 nm, 600 nm, and 650 nm. For example, the illumination source includes a broadband white light sources and/or each imager may include a color filter. In other embodiments the images may represent polarization conditions, imaging angle, resolution, spatial modularity, focal plane modularity, and/or TIR conditions. In some embodiments, each image may represent the optical effects of light of a particular wavelength interacting with skin and. Due to the optical properties of skin and skin components that vary by wavelength, polarization, and/or angle of imaging, each of the multispectral images 10005, 1010, 1015, 1020, and 1025 will be, in general, different from the others.

In some embodiments, each of the multispectral conditions correspond to a different wavelength or wavelengths of light. Accordingly, the datacube may thus be expressed as $R(X_S, Y_S, X_I, Y_I, \lambda)$ and describes the amount of diffusely reflected light of wavelength $\lambda$ seen at each image point $X_I$, $Y_I$ when illuminated at a source point $X_S$, $Y_S$. Different illumination configurations (flood, line, etc.) can be summarized by summing the point response over appropriate source point locations. A fingerprint or handprint image $F(X_I, Y_I)$ can loosely be described as the multispectral data cube for a given wavelength, $\lambda_o$, and summed over all source positions:

$$F(X_I, Y_I) = \sum_{Y_S} \sum_{X_S} R(X_S, Y_S, X_I, Y_I, \lambda_0).$$

The multiple images collected from a single acquisition event may thus be post-processed to produce a single composite fingerprint image that is fully compatible with conventionally collected "standards-based" legacy fingerprint databases. In addition the multispectral images may be used to ensure that the sample has optical properties consistent with a living human finger. The composite image and the liveliness assessment may be reported by the analyzer 108.

Contactless Finger Sensor

A contactless biometric sensor does not include a platen that defines a target space where illumination sources and/or imagers are focused and/or where a sample may be placed for imaging. Instead, the imagers and/or illumination sources may be focused at a target space that is defined within free space without definition with a platen or any other physical element or device. A user may place their hand and/or finger(s) within the target space without touching, contacting, and/or referencing a platen. In some embodiments the biometric system and/or device may include a window between at least some of the optical elements, for example, imagers and/or illumination sources, and the target space. Such a window may be used to seal the optical elements for protection from the elements and to keep the area clean. Such a window should not be confused with a platen and is not configured to receive a skin site. Accordingly, a finger may be placed within the target space and imaged with one or more imagers. As discussed throughout this disclosure in various embodiments, a contactless biometric system may use various techniques to provide a user an indication of the location and/or bounds of the target space. In other embodiments, the imagers singularly or in combination may employ various techniques to image a finger and/or hand depending on the relative location of the finger and/or hand to the imagers.

FIGS. 7A, 7B, 7C and 7D illustrate various views of a contactless biometric sensor apparatus according to one embodiment. In this embodiment, the contactless biometric sensor includes four imagers 730, optional optical elements 735, and four illumination sources 720. Any number of imagers and/or illumination sources may be used. The simplest contactless biometric sensor includes a single illumination source and a single imager. The four imagers 730 may provide spatial modularity, multispectral modularity, focal modularity or a combination of the above. For example, each imager 730 may image a different area of the target space. As another example, each imager may imager the finger under distinct multispectral conditions.

FIGS. 8A, 8B, 8C and 8D illustrate various views of a multispectrally modular, contactless biometric sensor apparatus with multispectral imagers 830 that focus on different imaging planes according to one embodiment. Various illumination elements 820 are shown. As shown in the figure, the biometric sensor includes 16 imagers 830. In this embodiment, four imagers 830A, 830P, 830E, 8300 are focused on first imaging plane 880, another four imagers 830D, 830M, 830F, 830N are focused on a second imaging plane 881, another four imagers 830H, 830C, 830G, 8301 are focused on a third imaging plane 882, and yet another four imagers 830B, 830L, 830K, 830J are focused on a fourth imaging plane 883. For the sake of clarity, the focal plane for each imager is shown for some, but not all imagers, in the figure. Each of the four imagers focused at the same imaging plane are configured to provide an image under a different multispectral condition. Thus, the imagers may be configured to provide the same multispectral images of the finger at each imaging plane. While 16 imagers are shown in the figure, any number of imagers may be used with any combination focused at different imaging planes and/or providing different multispectral images.

Figure 9A:
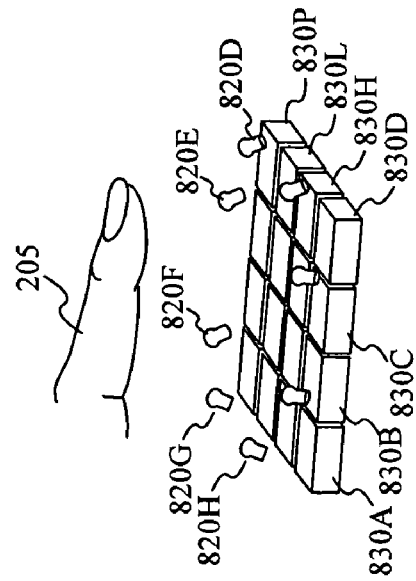
FIGS. 9A, 9B, 9C and 9D illustrate various views of a spatially modular, contactless biometric sensor apparatus with imagers that focus on different imaging planes according to one embodiment.
Figure 9B:
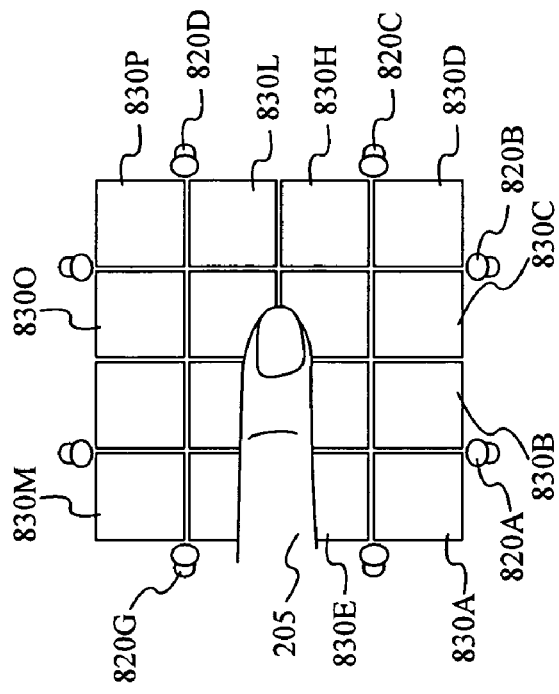
Figure 9C:
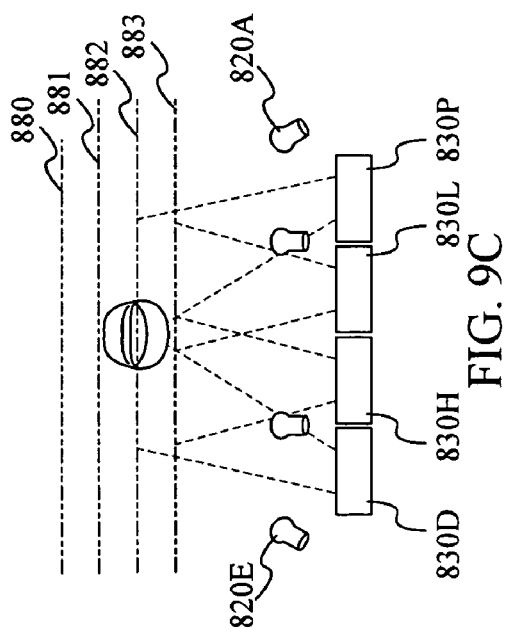
Figure 9D:
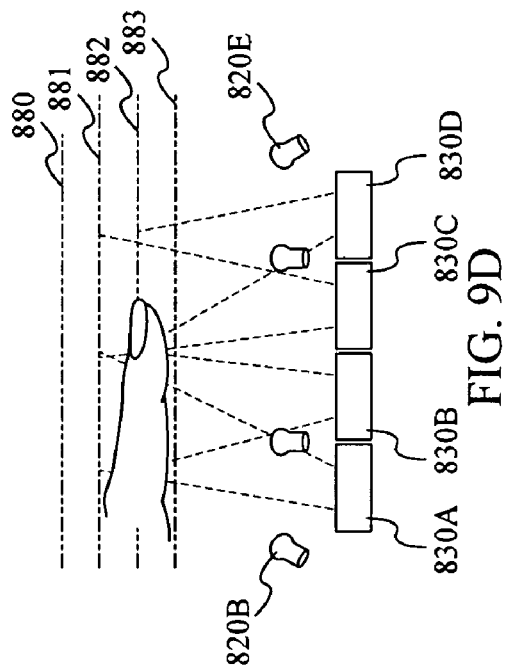

FIGS. 9A, 9B, 9C and 9D illustrate various views of a spatially modular, contactless biometric sensor apparatus with imagers that focus on different imaging planes according to one embodiment. Various illumination elements 820 are shown. In this embodiment subsets of four imagers are focused on different imaging planes as described above in regard to FIGS. 8A, 8B, 8C and 8D. However, in this embodiment each of the four imagers in each subset are focused on a different spatial portions of the imaging plane, thus providing spatial modularity. As can be seen in FIG. 9C, in this embodiment, imagers 830D and 830P are focused on different portions of imaging plane 882, and imagers 830H and 830L are focused on different portions of imaging plane 883. As can be seen in FIG. 9D, in this embodiment, imager 830D is focused on imaging plane 882, imager 830C is focused on imaging plane 881, and imagers 830A and 830B are focused on different portions of imaging plane 881.

In any embodiment, each of the imagers may be a small wafer-level camera. Moreover, the entire array of imagers may be provided on a single wafer and/or circuit board. For example, such imagers may be OptiML™ wafer-level camera produced by Tessera® or the like. Various other wafer-level cameras may also be used. In other embodiments CMOS sensors and/or CCD sensors may be used as imagers.

Various other contactless systems may be used. For example, imagers with auto focus may be used to focus light from a finger and/or hand at a various distance from the imager. In another embodiment, an imager may be used that provides a large depth of field.

In another embodiment, an imager may be used that has a large numerical aperture. In yet another embodiment, wavefront coding transfer functions may be used.

Spatially Modular Hand Sensor

FIGS. 11A, 11B, 11C and 11D illustrate various views of a spatially modular biometric hand sensor apparatus according to one embodiment. The biometric hand sensor, according to this embodiment includes a large platen 1110 with a target surface 1112 for receiving a hand 915. A plurality of light sources 1120, optional optical elements 1135, and imagers 1130 are also included. Each imager may be focused on a different portion of the target surface 1112. In some embodiments, the portions of the target surface imaged by the imagers 1130 overlap and/or cover the entire target surface 1112 as shown in the figures. In other embodiments, the portions of the target surface imaged by the imagers 1130 do not overlap. In yet another embodiment, the portions of the target surface 1112 imaged by the imagers do not cover the entire target surface 1112, instead they cover only specific portions of the target surface. Any number of illumination sources may be used to illuminate a hand 1115 on the target surface 1112. Depending on the design and/or needs, more or less imagers 1120 may be used to image the target surface 1112. Due to the modularity of the imagers, additional imagers may be added.

Figure 18:
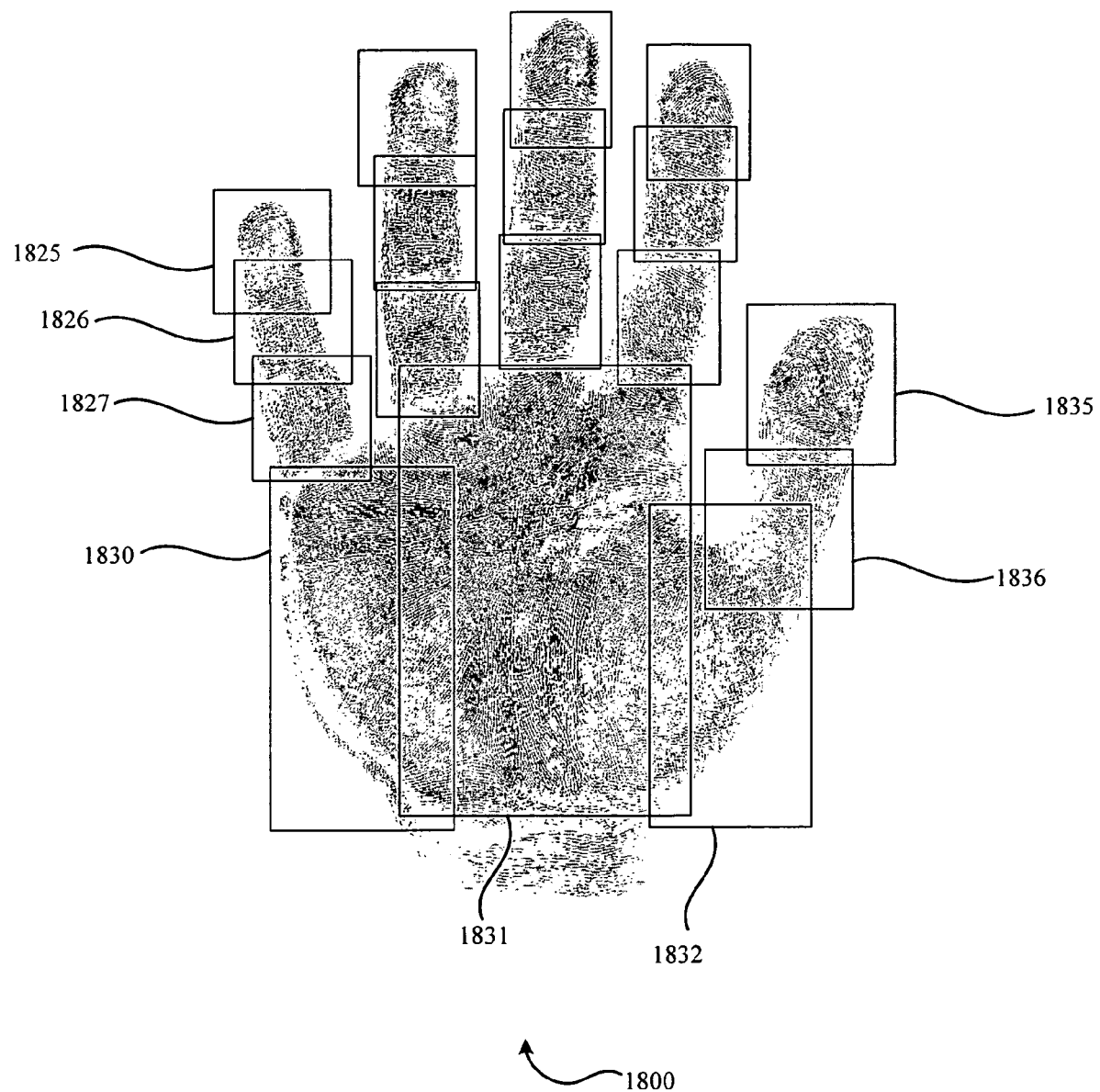
FIG. 18 shows an image of a hand with five zones imaged with a spatially modular imagines system according to one embodiment.
Figure 20:
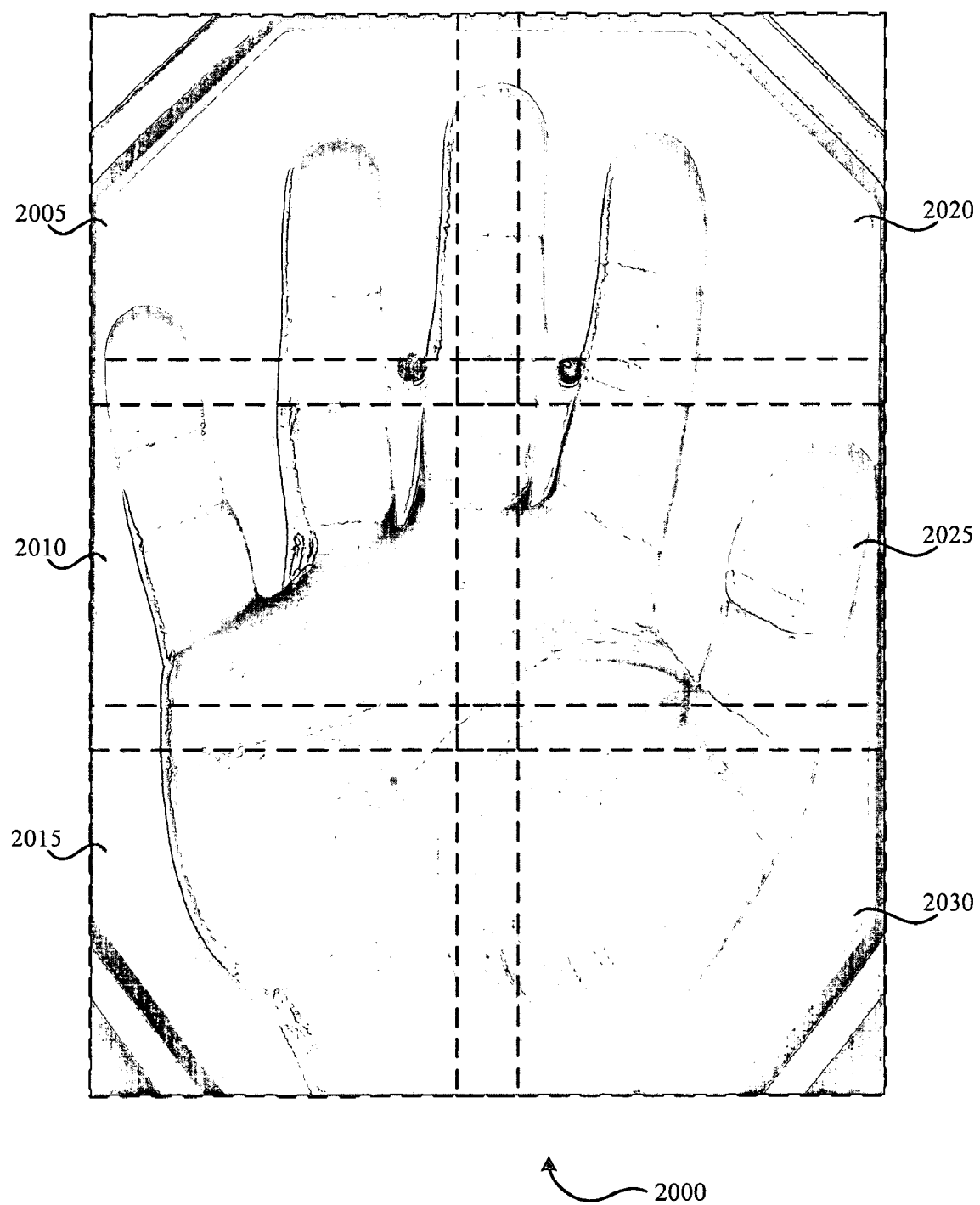
FIG. 20 illustrates six overlapping images of a hand from four spatially modular imagers according to one embodiment.
Figure 21:
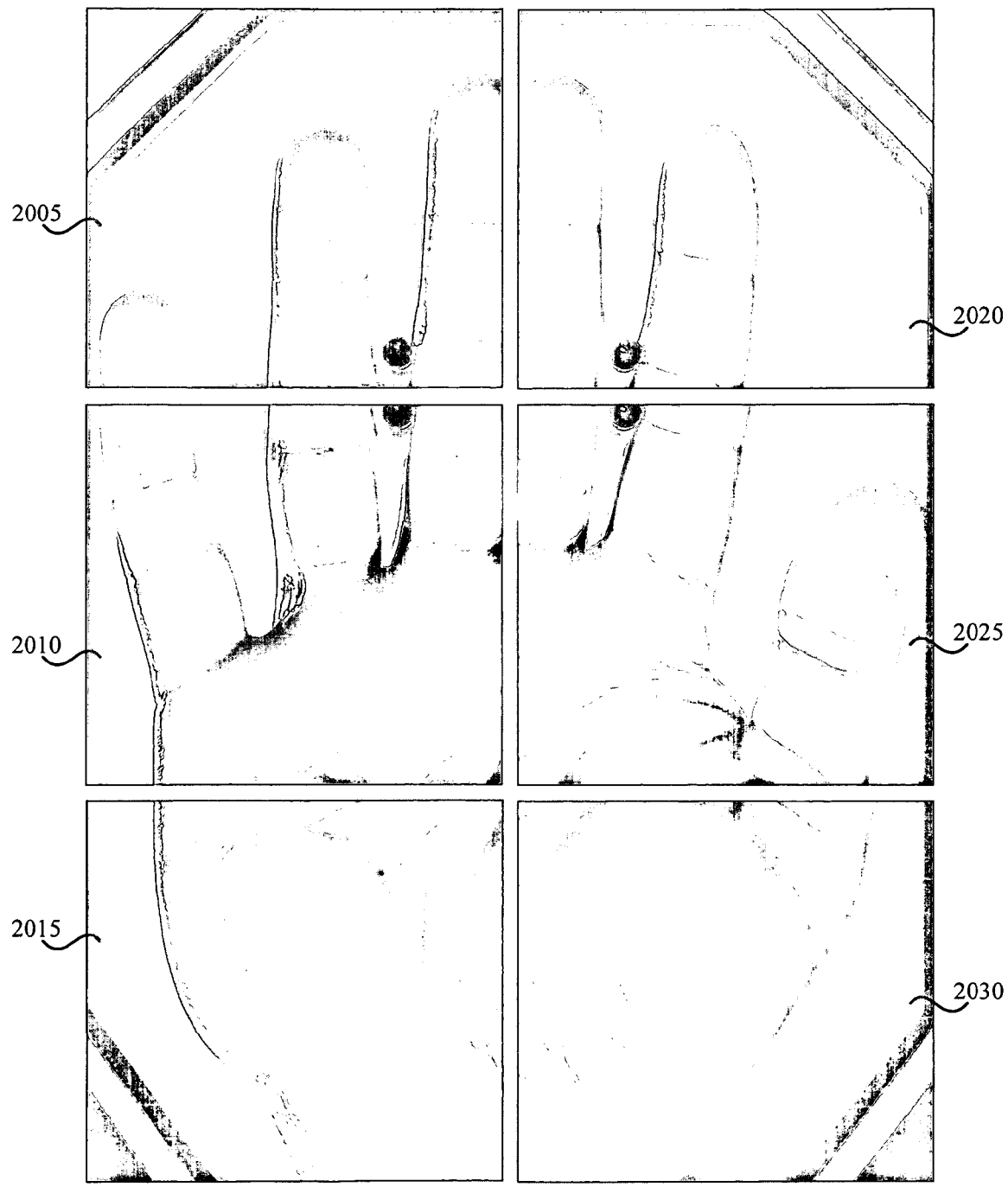
FIG. 21 separately illustrates the six overlapping images in FIG. 20.

A spatially modular biometric sensor may provide images of portions of hand 2005, 2010, 2015, 2020, 2025, 2030 according to one embodiment, as shown in FIG. 21. Each image includes a similarly sized imager of a portion of a hand. Some overlap between images may occur as shown in FIG. 20. In another embodiment, specific locations of a hand are imaged by a different imager as shown in FIG. 18. Three images are produced for each finger. For example, the pinky (the smallest, left-most finger) is imaged in three areas 1825, 1826, 1827 corresponding to the portion of the finger between the knuckles or joints. The other fingers have similar coverage. The thumb is imaged in two areas 1825, 1836 between joints. The body of the hand is imaged in three locations, the hypothenar 1830, palm core 1831, and thenar 1832. Any other combination of images of the hand may be devised.

Figure 19:
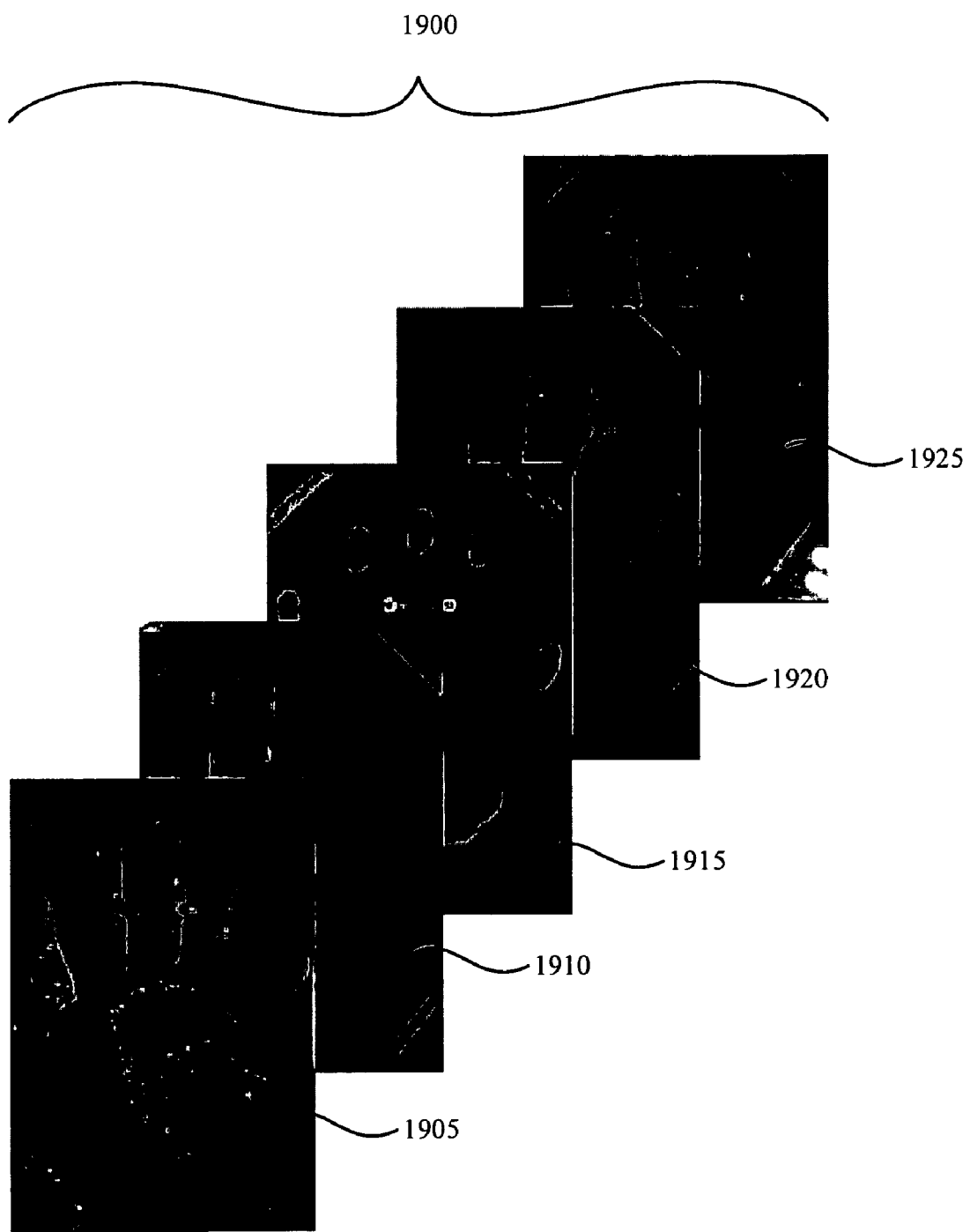
FIG. 19 illustrates a multispectral datacube of a hand generated in accordance with various embodiments.

As shown in FIG. 19, a multispectral hand sensor, whether contactless or not, may provide a datacube 1900 that includes images that correspond to each of the multispectral conditions used to image the hand in the measurement process. In the figure, five separate images 1905, 1910, 1915, 1920, and 1925 are shown, corresponding to five multispectral conditions. In an embodiment where visible light is used, the images might correspond, for example, to images generated using light at 450 nm, 500 nm, 550 nm, 600 nm, and 650 nm. For example, each imager may include a color filter. In other embodiments the images may represent polarization conditions, imaging angle, and/or TIR conditions. In some embodiments, each image may represent the optical effects of light of a particular wavelength interacting with skin and. Due to the optical properties of skin and skin components that vary by wavelength, polarization, and/or angle of imaging, each of the multispectral images 1905, 1910, 1915, 1920, and 1925 will be, in general, different from the others.

Figure 12:
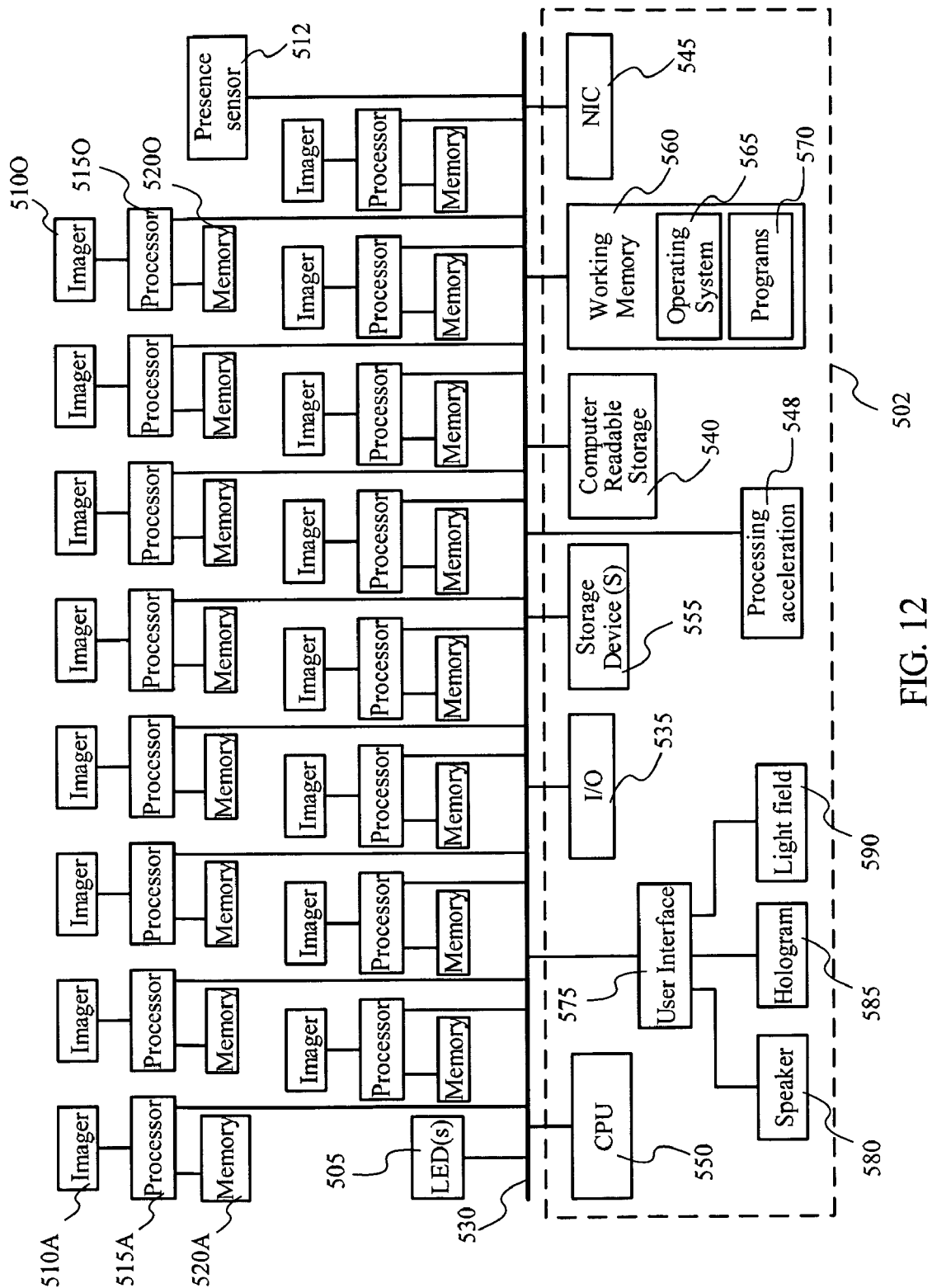
FIG. 12 shows a block diagram of a biometric hand sensor system according to one embodiment.
Figure 14B:
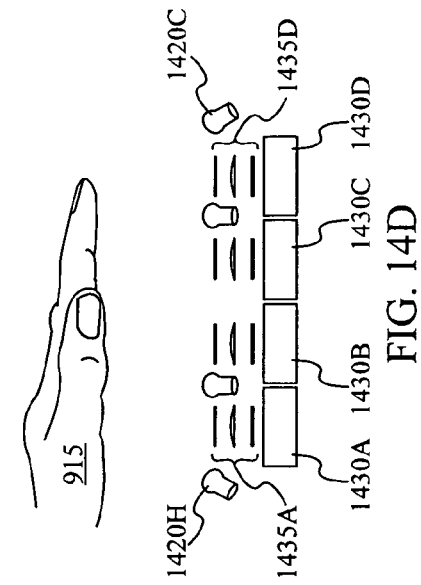
FIGS. 14A, 14B, 14C and 14D illustrate various views of a spatially and multispectrally modular, contactless biometric sensor apparatus according to one embodiment.
Figure 14A:
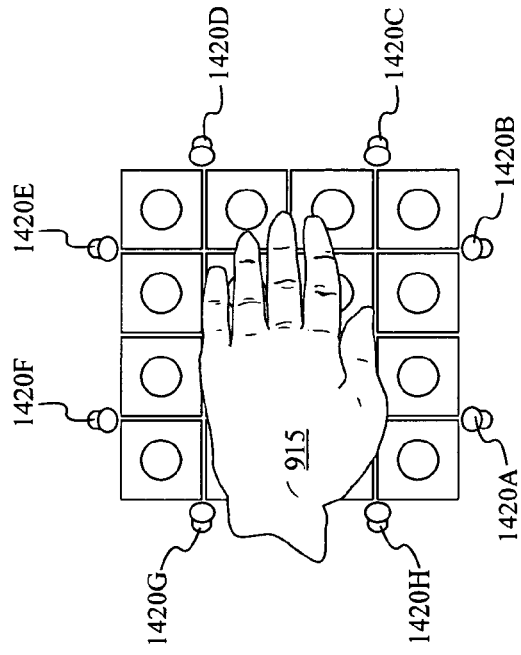
Figure 14D:
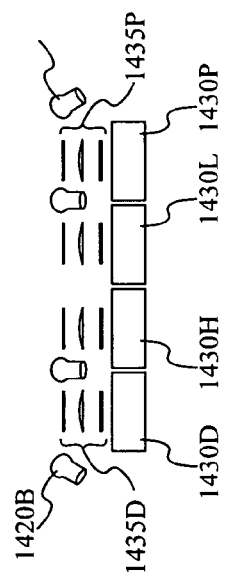
Figure 14C:
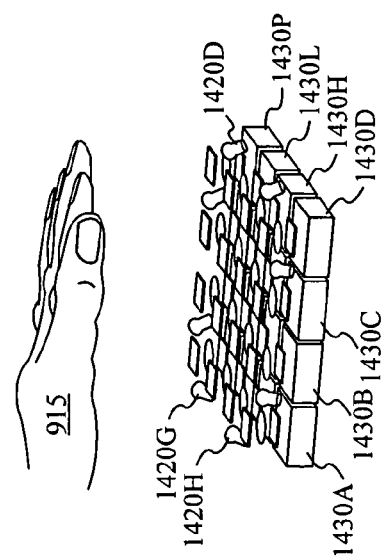
Figure 15B:
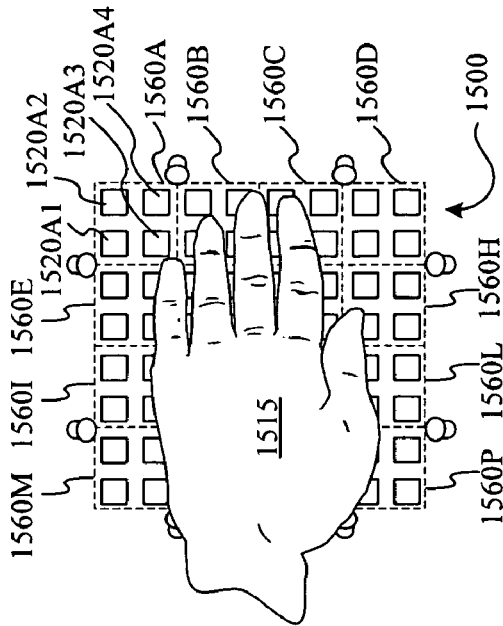
FIGS. 15A, 15B, 15C and 15D illustrate various views of a spatially and/or multispectrally modular, contactless biometric sensor apparatus with imagers that focus on different imaging planes according to one embodiment.
Figure 15D:
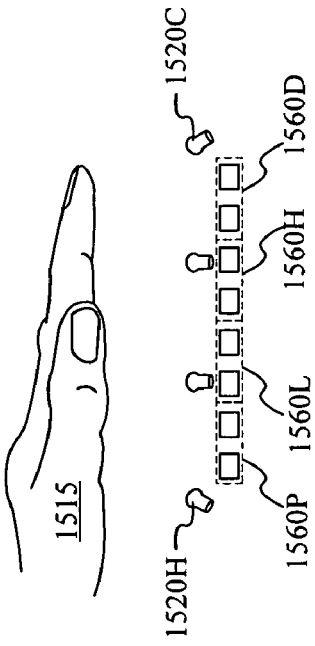
Figure 15A:
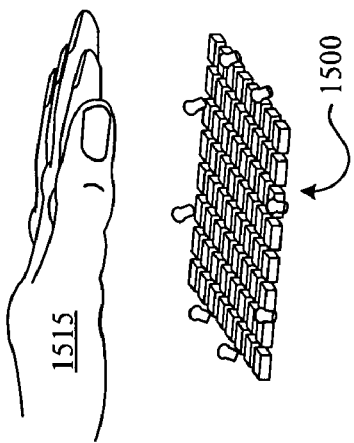
Figure 15C:
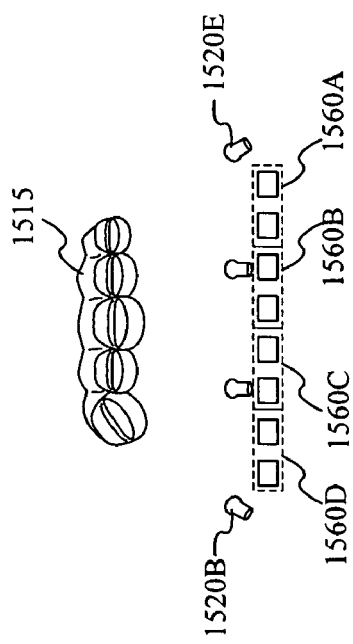

FIG. 12 shows a block diagram of a biometric hand sensor system including a computational device 502, such as the one shown in FIG. 5, according to one embodiment. In this embodiment, 16 imagers 510 and processors 515 with memory 520 are coupled to the computational device 502. In another embodiment, imager memory 520 may be shared amongst imagers 515 and/or with the computational device 502.

Contactless Hand Sensor

FIGS. 13A, 13B, 13C and 13D illustrate various views of a multispectrally and/or spatially modular contactless biometric sensor apparatus according to one embodiment. In this embodiment, the contactless biometric hand sensor includes four imagers 1330 and four illumination sources 1320. Any number of imagers and/or illumination sources may be used. The simplest contactless biometric hand sensor includes a single illumination source and a single imager. The four imagers 1330 may provide spatial modularity, multispectral modularity, focal plane modularity or a combination of the above. For example, each imager 1330 may image a different area of the target space. As another example, each imager 1330 may imager the hand under distinct multispectral conditions. As another example, each imager 1330 may image a different focal plane.

FIGS. 14A, 14B, 14C and 14D illustrate various views of a spatially and multispectrally modular, contactless biometric sensor apparatus according to one embodiment. Sixteen imagers 1420, and sixteen optional optical elements 1435 are shown along with eight illumination sources 1420. Any number of illuminations sources 1420 of any type may be used. Various optical elements 1435 may also be used.

FIGS. 15A, 15B, 15C and 15D illustrate various views of a spatially and/or multispectrally modular, contactless biometric sensor apparatus with imagers that focus on different imaging planes according to one embodiment. For convenience in describing these embodiments, four imagers 1520 are shown in groups 1560 outlined by doted lines. For example, a first group 1560A includes imagers 1520A1, 1520A2, 1520A3, and 1520A4. Each of these imagers provides imaging coverage for a first zone in target space corresponding to their placement in the imager array 1500, yet each imager 1520 is also focused on different imaging plane. Thus, the imagers 1520 within a group 1560, provide coverage for a specific lateral zone, possibly with overlap, they also provide coverage for vertical distance from the imagers by focusing at different focal planes. While the figure shows four imagers 1520 placed in a group 1560, any number of imagers may used. Moreover, any number of groups 1560 may be used as well. Due to the modular nature of the system, imagers 1520 and groups 1560 may be added as needed.

In another embodiment, each imager 1520 within a group 1560 may image the hand under a different multispectral condition. For example, imager 1520A1 may provide an image of red light from the area of the hand corresponding to the group 1560A location in the imager array 1500. Imager 1520A2 may provide an image using a polarizer of the area of the hand corresponding to the group 1560A location in the imager array 1500. Imager 1520A3 may provide an image with a resolution of 2,000 PPI or higher, while other imagers provide imagers with a resolution less than 2,0000 PPI. Imager 1520A4 may provide an image of green light from the area of the hand corresponding to the group 1560A location in the imager array 1500. Various other multispectral conditions may be used as well. Imagers within a group, according to another embodiment, are not necessarily contiguous as shown. Moreover, in another embodiment, the placement of the imagers 1520 within the imager array 1500 may be placed at different locations or elsewhere than within a close planar imager array 1500 as shown.

In another embodiment, the imager array 1500 may provide imagers 1520 that provide spatial, multispectral and focal plane modularity. For example, the imagers may image spatial zones of a hand within the target space. Subset of these imagers may be focused at various focal planes with various multispectral conditions. That is, each imager may image a spatial zone at a set focal plane using one multispectral condition. Those skilled in the art will recognize the various combinations that can be implemented.

Proximity Sensor User Interface

Figure 16:
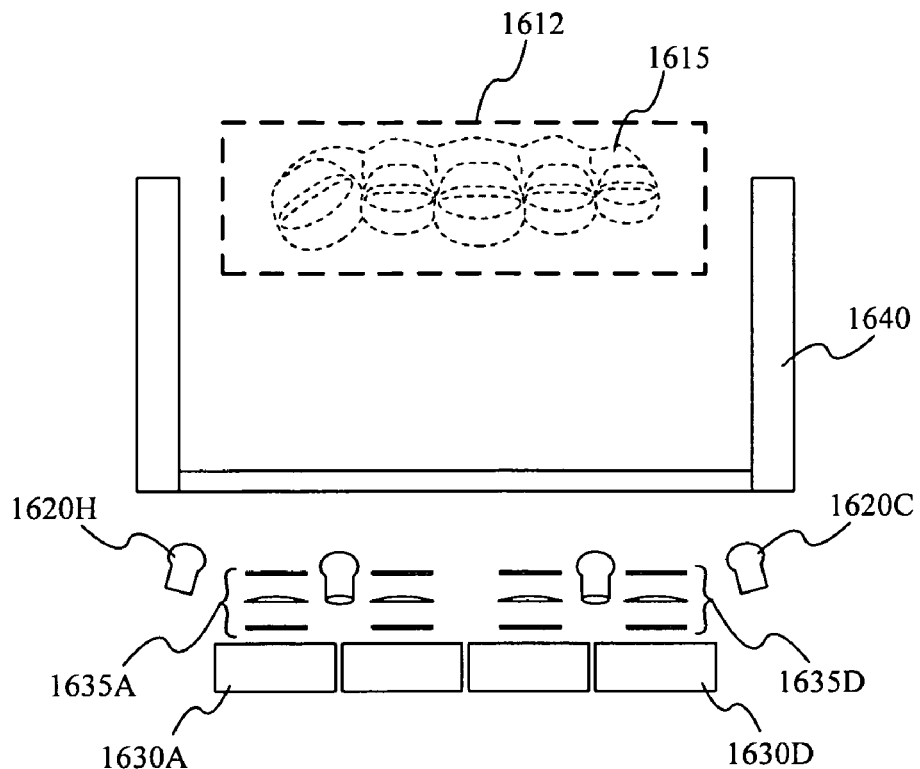
FIG. 16 shows a contactless biometric system user interface with a holographic image of a hand according to one embodiment.

FIG. 16 shows a contactless biometric system user interface with a holographic image of a hand 1615 according to one embodiment. As shown, a number of illumination sources 1620, imagers 1630 and optical elements 1635 are shown. The imagers 1630 and illumination sources 1630 are configured to illuminate and image a hand and/or finger placed within the target space 1612. Holographic image generator (not shown) is included that provides a holographic image of a hand 1615 within the target space 1612. Thus, a user may place their hand within the target space 1612 by placing their hand on, near, or within the holographic hand image 1615. The holographic image generator may also provide a volumetric display or image. An optional structure 1640 is shown in the figure. Other embodiments may use a holographic image of a finger rather than a hand.

Figure 17:
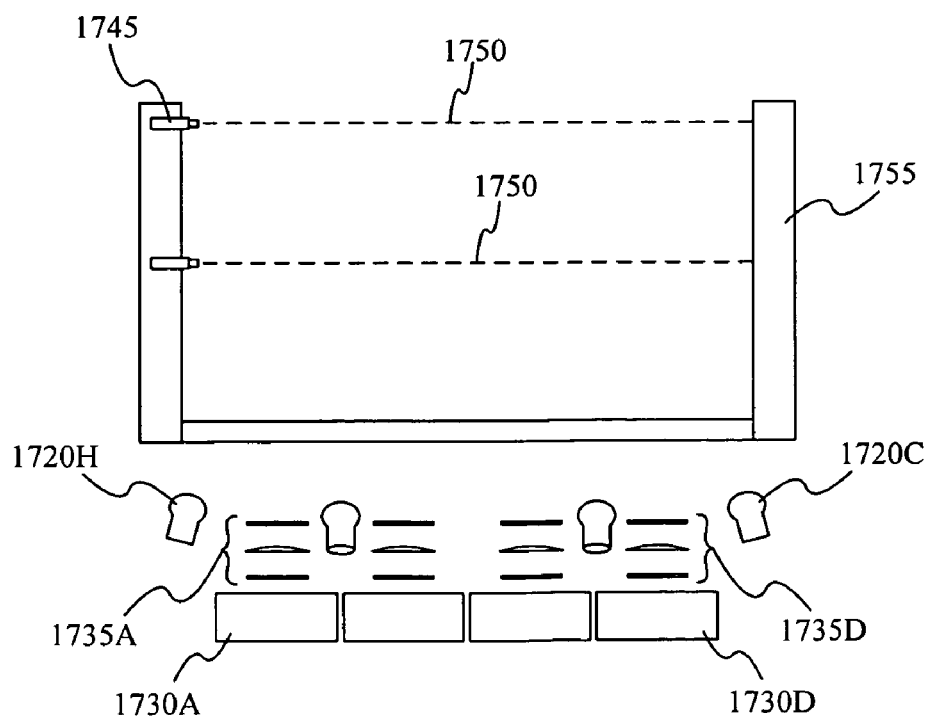
FIG. 17 shows a contactless biometric system user interface with a light array according to one embodiment.

FIG. 17 shows a contactless biometric system user interface with a light array 1750 according to one embodiment. As shown, a number of illumination sources 1720, imagers 1730 and optical elements 1735 are shown. The imagers 1730 and illumination sources 1730 are configured to illuminate and image a hand and/or finger placed within the target space. Two light sources 1745, for example two lasers or laser diodes, each provide a light beam 1750 that at least partially defines some boundaries of the target space. Any number of light sources may be used in any configuration. As a user moves their hand or finger into the target space, the user can see the light beam on their hand or finger and know that they are approaching a boundary of the target space. An optional structure 1740 is shown in the figure.

Various other user interface elements may be implemented. For example, in one embodiment a proximity sensor may be implemented in conjunction with a speaker or other visual interface. The proximity sensor, for example, may user stereoscopic imagers and/or stereoscopic light sources. When the proximity sensor detects the presence of an object within the target space, the illumination sources may illuminate the object and the imagers may image the object within the target space. An audible interface, for example, a speaker, may also be used to alert the user that an image has been taken, that the user's hand and/or finger is within the target space, and/or to ask the user to move their hand and/or finger to align it within the user space.

Proximity Sensor

A proximity sensor and/or presence sensor may also be included in various embodiments. In contactless biometric systems, it is important to know whether a biometric feature of interest is within a target space. A proximity sensor may make such a determination. For example, a proximity sensor may incorporate stereoscopic imagers and/or stereoscopic illumination sources. The system may then analyze when peak intensities approach a calibrated area of an image associated with the target space. A stereoscopic illumination proximity sensor may include at least two illumination sources located a distance apart form each other and an imager placed between the two illumination sources. As an object under illumination by such stereoscopic illumination sources, approaches the imager a graph of the peak intensities across the imager converge. The system may then determine whether the object is within the target space by making a comparison with calibrated data.

A stereoscopic proximity sensor may include at least two imagers sources located a distance apart form each other and an illumination source placed between the two imagers. As an object under illumination, approaches the illumination source and/or imagers, a combined graph of the peak intensities of the two imagers begin to converge. Moreover, a single imager and two illumination sources may be used. Similarly, a graph of the intensity versus lateral imager position will provide converging peaks as an object approaches the imager and/or illumination sources. The system may determine whether an object is within the target space by making a comparison with calibrated data. Various other proximity detection techniques are provided in previously incorporated U.S. patent application Ser. No. 12/100,597.

In yet another embodiment, a light source may illuminate the target space with a large angle of incidence, for example, greater than 60° from the normal of the target space. The light source, in various embodiments, may be a monochromatic blue light source or, in another embodiment, the light source may emit monochromatic light less than about 600 nm. The light source or sources illuminate not only the target space but also the area immediately above the target from beneath the target space. A color filter array filters light from the target space prior to the light being incident on an imager. The color filter array may be any color filter array described in the various embodiments described herein. The color filter array filters light according to wavelength bands. Thus, the relative intensity of a wavelength band may be compared with other wavelength bands. As a purported biometric feature approaches the target, monochromatic light is reflected from the surface of the biometric feature. Accordingly, the relative intensity of the wavelength band containing the wavelength of the monochromatic light increases relative to other frequency bands as the purported biometric feature approaches the target. Accordingly, the intensity of blue light is monitored relative to the intensity of red and/or green light. If the intensity of blue light relative to the intensity of red and/or green light increases, then a purported biometric feature is proximate to the target space. If the blue light intensity does not increase enough, than there is no purported biometric feature proximate to the target and the system continues to monitor the intensity levels of various wavelength bands.

Figure 22:
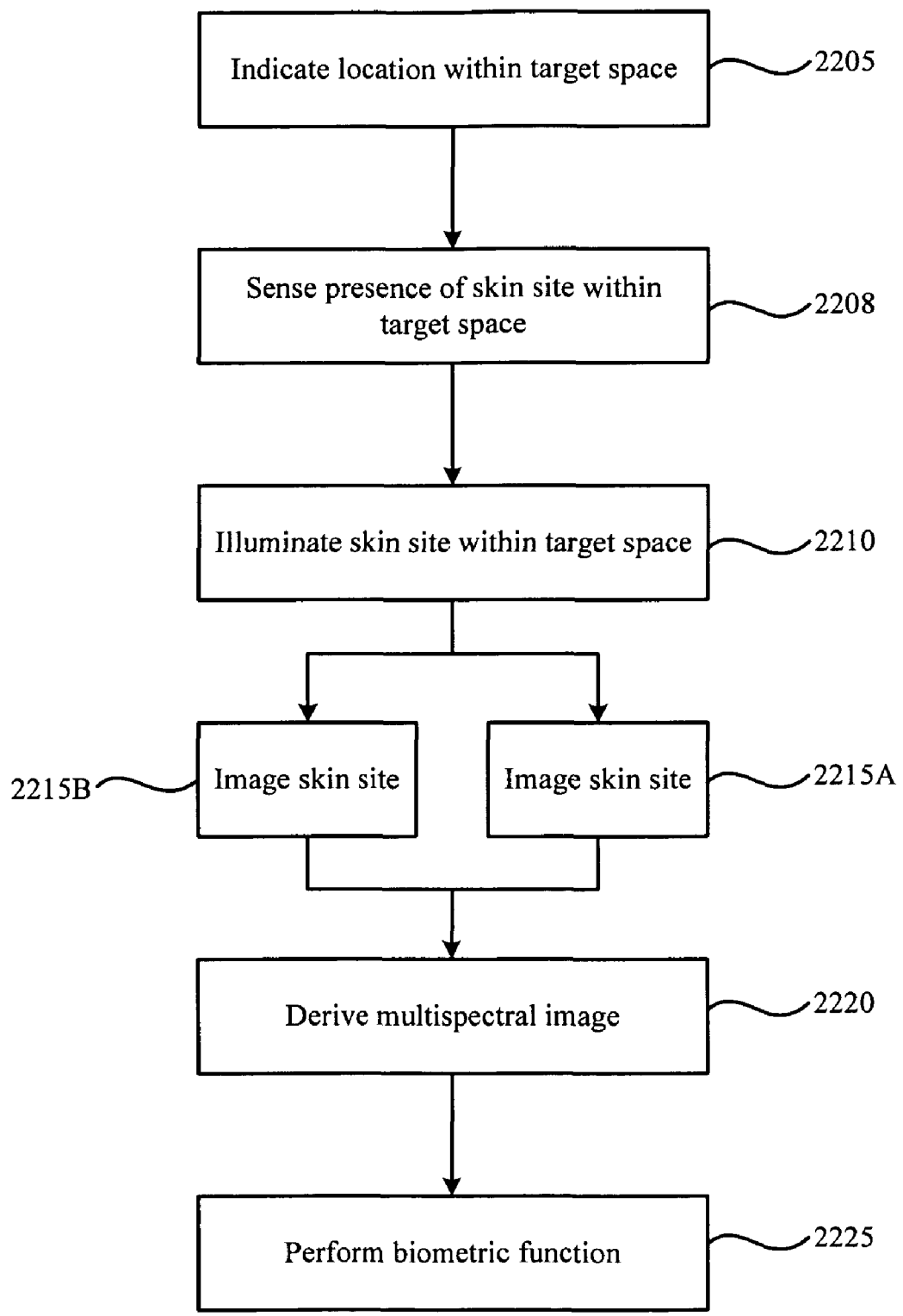
FIG. 22 shows a flowchart of a biometric detection using various embodiments described herein.

FIG. 22 shows a flowchart of a biometric detection using various embodiments. While a number of steps or processes are shown, embodiments may include every step or process, additional steps or processes, or only a one or more steps or processes. Moreover, each step or process may include various sub-steps or sub-processes. At block 2205 the location of the target space is indicated to a user. This indication may include, for example, a holographic image, light beam array, audio indications, visual indications, a platen, a prism, etc. The presence of an object within the target space, such as a skin site, is sensed or detected at block 2208. The presence of an object within the target space may be sensed using stereoscopic imagers and/or stereoscopic illumination sources and/or multispectral techniques. The skin site is illuminated at block 2210. The illumination may occur prior to any other step described herein and/or may occur only after the presence of a skin site is detected. Various illumination sources may be used under any variety of multispectral conditions, such as, wavelength, wavelengths, polarization, angle, etc. During illumination the skin site is imaged using two imagers at block 2215A and 2215B. These imagers may image the skin site substantially simultaneously. That is, these imagers may see the object in multiple ways under a single illumination sequence. Any number of imagers may be used. The imagers may image the skin site under any variety of multispectral conditions, such as, wavelength, wavelengths, polarization, resolution, spatial modularity, focal plane modularity, imaging angle, etc. A multispectral image may be derived from the images produced from the imagers at block 2220. A biometric function may then be performed at block 2225. The biometric function may include identification of an individual, associating an individual with an access code, associating an individual with a group of individuals, determining whether access to a facility, building, resort, activity, automobile, security area, and/or device is permissible, performing a liveliness determination, performing a spoof determination, biometric matching (identification or verification), and/or estimation of demographic parameters including age, gender and ethnicity, etc.

Exemplary Hardware

Various embodiments described herein use a light source to illuminate a target area, target surface, platen, skin site, finger, hand, etc. Such illumination sources may include a broadband source such as an incandescent bulb, a white-light LED, a glowbar, or others of the sort. Alternatively, the illumination source may comprise one or more narrow-band sources such as LEDs, lasers and laser diodes, quantum dots, optically filtered sources and the like. In some cases, the illumination system may incorporate optical polarizers in such a way that the light from one or more sources is polarized before impinging on the hand. In some cases the polarizer may be a linear polarizer or a circular polarizer. In some embodiments, multiple light sources are illuminated simultaneously during normal operation. In other cases, the multiple light sources may be illuminated in some sequence, during which a multiplicity of images are captured and recorded. In some embodiments more than one illumination source is shown in a figure or described, in such embodiments, a single light source may also be used.

Some embodiments described herein require one or more imagers. These imagers may comprise, for example, a silicon CMOS imager or a silicon CCD imager. Alternatively, the imager may comprise a photodiode array made of materials such as MCT, lead-salt, InSb, InGaAs, or a bolometer array, or other devices and materials that enable the capture of images corresponding to the desired illumination wavelengths. In another embodiment a wafer-level imager or an array of wafer level imagers may be used. In addition to the imaging array, there may be one or more polarizers present in the imaging system and located such that the imager "views" the hand or a portion thereof through the polarizer. Such polarizers may be linear or circular polarizers. In some cases, the polarizer in the imaging system may be arranged such that it is substantially orthogonal or crossed relative to one or more polarizers present in the illumination system. In some cases, the imager polarizer may be arranged to be substantially parallel or the same orientation as the illumination polarizer.

In cases where the imager views the hand through a polarizer that is substantially crossed relative to the illumination polarizer, the resulting image tends to emphasize image features that lie below the surface of the skin. In cases where the imager views the hand through a polarizer that is substantially parallel to the illumination polarizer, the resulting image tends to emphasize image features that lie at or near the surface of the skin. In cases where either the illumination polarizer or image polarizer or both are omitted, the resulting image tends to contain effects from both surface and subsurface features. In some cases, it may be advantageous to collect and analyze images collected under different polarization conditions in addition to or instead of images taken with different illumination wavelengths.

In some cases, an imager may be a color imager capable of separating multiple wavelength bands. The use of such a color imager may be used in cases that a broad-band illumination source is used or multiple, different narrow-band illumination sources are turned on simultaneously. In such cases, information from multiple illumination conditions may be collected simultaneously, reducing the time and/or data volume requirements of an equivalent sequential series of monochromatic images. In some cases the color imager may be obtained by combining a digital imager with broad wavelength response with a color filter array that provides a narrower wavelength response to each imager pixel. In some cases the color filter array may contain three different color-selective filters (red, green and blue) in a Bayer pattern as known to one familiar in the art. Other variations of a color filter array as well as other means of color separation may also be advantageously employed.

Both the illumination and imaging systems may include other optical components such as lens, mirrors, phase plates, shutters, diffusers, band-pass optical filters, short-pass optical filters, long-pass optical filters, and the like in order to direct, control and focus light in a manner known to one familiar in the art.

In addition to the illumination and imaging subsystems, there may be a platen on which the hand is placed for imaging. Alternatively, the platen may be omitted and the hand imaged in free space.

In various embodiments, the light sources and/or illumination sources are white-light LEDs. There may be two banks of LEDs: one with a linear polarizer present and one without a polarizer. Both banks of LEDs illuminate a platen through diffusers, lenses and/or mirrors to achieve moderately consistent illumination over the platen area. The platen may be a plane glass plate. The imagers described throughout this disclosure may be color silicon CMOS or CCD imagers, monochromatic imagers, wafer-level cameras, etc. Lenses and/or mirrors are used to image the top surface of the platen onto the imager may also be used in embodiments described herein. A short-pass filter is placed in the imaging system to significantly reduce the sensitivity of the imager to infrared light may be used. A linear polarizer may be placed in the imaging system such that it is substantially orthogonal to the polarizer present in one of the illumination banks. In other embodiments, the imaging system and number of pixels may be designed to image at a resolution of between 100 and 2,000 pixels per inch (PPI). In other embodiments, the imaging system may be designed to image the hand with a resolution of approximately 500 PPI. A series of two images may be collected: one with the non-polarized white light illuminating the hand and one with the cross-polarized light illuminating the hand. Optionally, a third image may be collected with all illumination LED's turned off, resulting in an image that represents the effect of ambient light. In some cases, the ambient-light image (or some grey-level scaled version of it) may be subtracted from one or both of the illuminated images to produce an estimate of corresponding images in which no ambient light is present.

Moreover, one or more imagers in any of the various embodiments may include a high resolution imager. As noted above, a multispectral image can be derived from images with different resolutions. That is, imagers with various resolutions may be used to derive a multispectral image. Such imagers may be used, for example, to image the hand(s) and/or foot (feet) of infants, including neonatal and/or premature infants. In one embodiment, a high resolution imager may be capable of imaging at least 1,000 pixels per inch (PPI). Such images may be capable of showing pores and/or the shape of ridges in a finger and/or hand or foot. In another embodiment, a high resolution imager may be capable of imaging at least 2,000 PPI, which may show pores and/or the shape of ridges in the finger and/or hand or foot of a neonatal or premature infant. In another embodiment, a high resolution imager may be capable of imaging at least 3,000 PPI. In another embodiment, a high resolution imager may be capable of imaging at least 4,000 PPI.

Various embodiments may be provide identification of an individual by analyzing an image of the individual's fingerprint, handprint and/or palm print. Such embodiments may compare minutiae points, fingerprint, palm print and/or handprint patterns, multispectral characteristics of an finger, hand and/or palm, etc. Other identifying features may also be used as skin discolorization, deformation, scars, marks, tattoos, moles, warts, freckles, etc. Anything within an image that may aid in the biometric determination may be considered.

Figure 23:
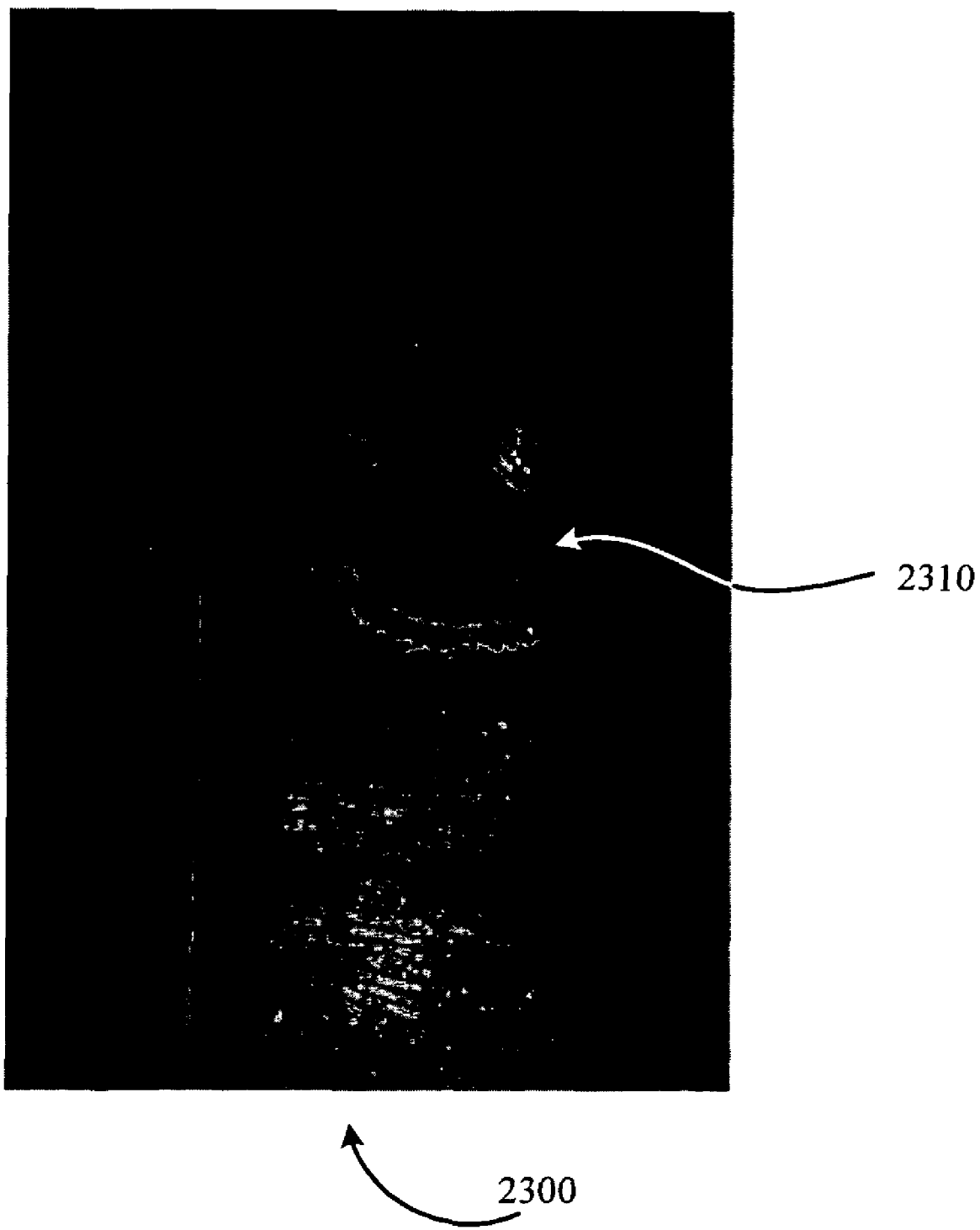
FIG. 23 shows an image of a finger with a tattoo-like feature according to one embodiment.
Figure 24:
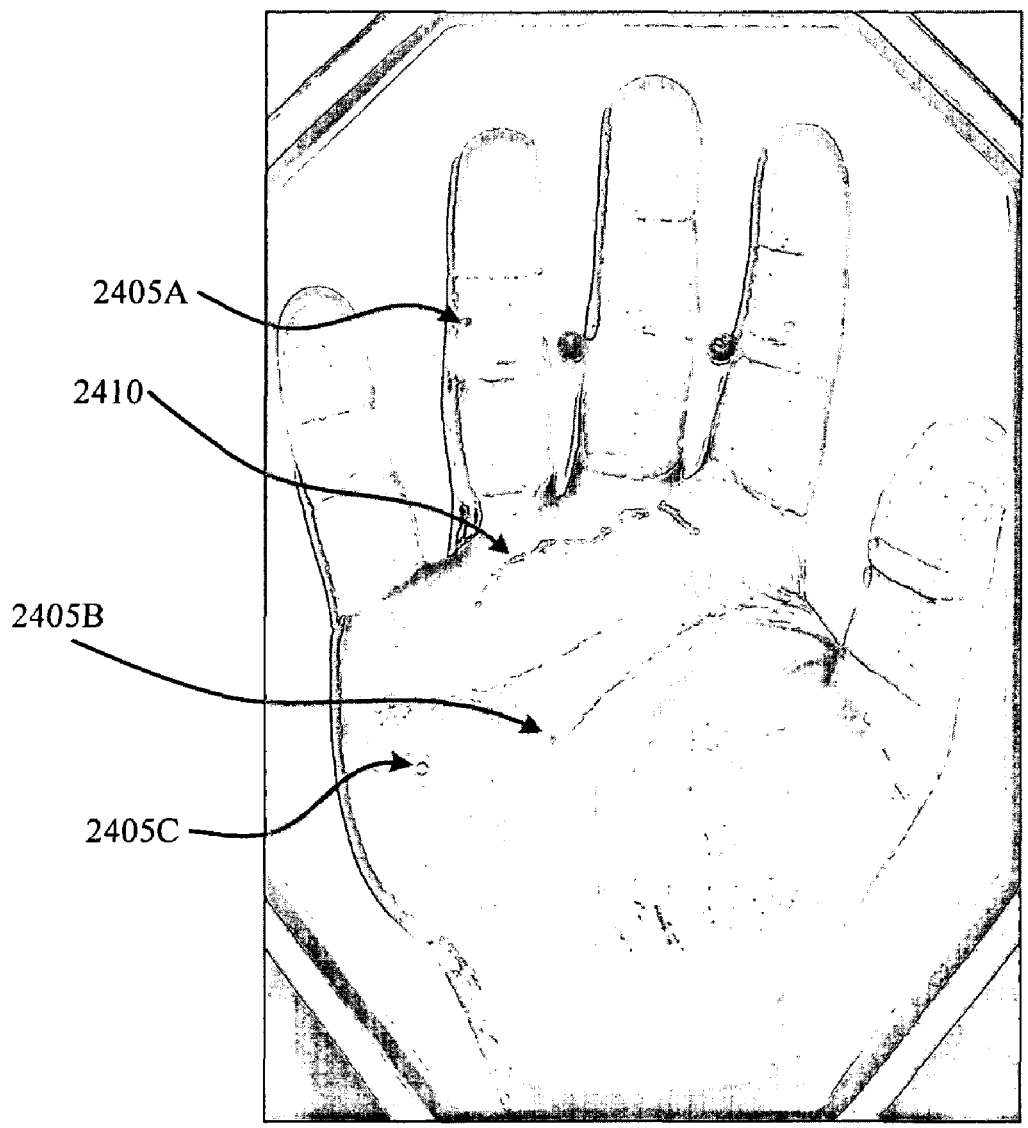
FIG. 24 shows an image of a hand with a number of moles and a scar according to another embodiment.

FIG. 23 shows an image of a finger 2300 with a tattoo-like feature 2310 according to one embodiment. A tattoo-like feature, a tattoo, or other markings may aid in a biometric determination. FIG. 24 shows an image of a hand 2400 with a number of moles 2405 and a scar 2410 according to another embodiment. Moles 2405, scars 2410, markings, and/or other discolorizations may also be used to aid in a biometric determination. Features such as tattoos, scars, and/or marks can be used as a highly reliable differentiator between individuals.

Certain existing sensor products that use multispectral imaging use contact as a mechanism of position registration to simplify several aspects of the system design. Multispectral imaging fingerprint technology also offers the industry's best protection against spoof attempts due to the extensive information that is captured with multispectral imaging. Such imaging yields extensive data from the surface and the subsurface optical characteristics of the finger or spoof material from which the fingerprint is acquired that makes differentiating genuine from fake readily done.

The sensor described herein provides a true contactless fingerprint sensor that is fast, intuitive, and easy to use, while capturing fingerprints that are fully compatible with historical Automated Fingerprint Identification System ("AFIS") systems. The sensor eliminates artifacts due to finger movement and facilitates easy and reliable user interaction. this rapid acquisition capability is obtained in one embodiment through the use of multiple imagers that are synchronized to simultaneously capture all required images.

For example, a plurality of the imagers may be used to monitor the space over the sensor, which may be further actively illuminated at some wavelength or illuminated by ambient light. The plurality of imagers may be used to detect motion in the space above the sensor and initiate a sensor arming sequence when such motion is detected. The plurality of imagers may further be used to determine the approximate location of the object in the space above the sensor based upon the differing (parallax) views of the imagers. The images from the plurality of sensors may be analyzed to determine when an object above the sensor is in the preferred space to trigger the sensor acquisition. In some embodiments, the images from the plurality of imagers will also be analyzed to determine if the object in the space above the sensor has the optical characteristics of the finger and will only trigger an acquisition when the object is consistent with a finger and in the proper location.

In one embodiment, the illumination subsystem comprises one or more light-emitting diodes that illuminate the region of interest above the sensor with light of the required characteristics. The light-emitting diodes may sometimes comprise white-light emitting diodes. Alternatively or additionally, one or more of the light-emitting diodes may be a narrow-band or monochromatic light source. In cases where a plurality of such light sources are used, the light sources may be substantially the same or they may have substantially different wavelength characteristics. In some cases, such light-emitting diodes may comprise sources that emit in red, green, and blue wavelengths. In some cases, one or more light-emitting diodes may emit at wavelengths other than visible wavelengths such as in the near ultraviolet or the near infrared. In any of these illumination configurations, one or more illumination source may be linearly polarized using a sheet polarizer (not shown).

In one embodiment, the imaging system may comprise a plurality of imagers. The imagers may be silicon arrays and may be fabricated as digital CMOS devices or CCD devices. One or more of the imagers may be panchromatic ("black and white") imagers. Some of the panchromatic imagers may incorporate a wavelength filter to limit the wavelengths that are substantially seen by the imager. The non-limited wavelengths may be a portion of the visible wavelength region. Alternatively, the non-limited wavelengths may comprise wavelengths in the near ultraviolet or near infrared wavelength regions. One or more of the imagers may be color imagers. The color imager may comprise a color filter array consisting of red, green and blue pixels arranged in some pattern such as a Bayer pattern. Alternatively, the color imager may be comprised of an arrangement of chromatic beam splitters and multiple panchromatic imagers, as known to one familiar in the art. While the discussion below sometimes makes specific reference to "color imagers" in providing examples of specific embodiments, it should be understood that these embodiments are merely exemplary and that other embodiments may incorporate some or all of the imager variations described herewith or others that will be obvious to one familiar in the art.

In a particular embodiment, the imaging subsystem comprises some number of color imagers that are oriented and focused on the trigger point of the three-dimensional sensing subsystem. When the position sensor is triggered, all imagers will substantially simultaneously capture an image of the finger that triggered the sensor. This rapid and substantially simultaneous collection of multiple images will mitigate motion artifacts and increase the overall robustness and user-friendliness of the sensing system. Some portion of the color images may sometimes have optical polarizer attached to them (not shown) in order to provide the ability to capture images in a crossed-polarized modality.

In some embodiments, the plurality of imagers may be oriented such that they all substantially image a similar region above the sensor. In other embodiments, some or all of the imagers may image different regions of space. In some embodiments the imaged regions may substantially overlap. In some embodiments the imagers may image different regions of space that are all substantially at the same focal distance or "height" above the sensor. In so doing, the sensor system may be able to capture a bigger object field than would be possible if the same imagers were focused on the same region of space. In some embodiments the imagers may image regions of space at different distances (heights) from the sensor, which enables the sensor to acquire data over a larger range of focal distances than provided for if all imagers were focused at the same focal distance.

Methods for obtaining a reliable and intuitive user interface are believed to include providing the user with a guide to proper orientation and placement of a finger through the use of a hologram that shows a hand and finger in the proper place above the sensor. This would permit the user simply to place his finger in a similar position, which will then trigger the measurement sequence.

Thus, having described several embodiments, it will be recognized by those of skill in the art that various modifications, alternative constructions, and equivalents may be used without departing from the spirit. For example, the principles described herein could be applied to four-finger acquisition, to whole-hand imaging, or to imaging of the skin on other body parts. Accordingly, the above description should not be taken as limiting the scope, which is defined in the following claims.

What is claimed is:

1. A whole-hand biometric sensor comprising:
    a platen configured to receive a human hand, wherein a surface of the platen defines a target surface;
    one or more illumination sources configured to illuminate at least a portion of the target surface;
    a first imager configured to receive light from at least a portion of the target surface under a first optical condition;
    a second imager configured to receive light from at least a portion of the target surface under a second optical condition, wherein the first optical condition is distinct from the second optical condition; and
    an analyzer communicatively coupled with the one or more illumination sources and the plurality of imagers, wherein the analyzer is configured to control the operation of the one or more illumination sources, the first imager, and the second imager in order to produce a multispectral image of an object placed on the target surface from the light received at first imager and the second imager.

2. The whole-hand biometric sensor according to claim 1, wherein the analyzer is configured to control the first imager and the second imager, and wherein the first imager and the second imager provide an image of the target space substantially simultaneously.

3. The whole-hand biometric sensor according to claim 1, wherein the first imager is configured to image a first spatial location on the target surface and the second imager is configured to image a second spatial location on the target surface, wherein the first spatial location and the second spatial location are distinct.

4. The whole-hand biometric sensor according to claim 1, wherein either or both of the first imager and the second imager comprise one or more optical element selected from the list consisting of a color filter, a color filter array, a linear polarizer, a circular polarizer, a diffuser, a collimator, a gratings, and a lens.

5. The whole-hand biometric sensor according to claim 1, wherein the first imager is focused
    at a first focal plane and the second imager is focused at a second focal plane, wherein the first focal plane and the second focal plane are distinct.

6. The biometric system according to claim 1, further comprising at least a first processor coupled with the first imager and a second processor coupled with the second imager.

7. The whole-hand biometric sensor according to claim 1, further comprising a presence
    detector configured to detect the presence of an object within the target space.

8. The whole-hand biometric sensor according to claim 1, wherein the first imager includes a
    wafer-level camera and the second imager includes a wafer-level camera.

9. The whole-hand biometric sensor according to claim 1, wherein the first optical condition includes imaging a first portion of the target space and the second optical condition include imaging a second different portion of the target space.

10. A method for collecting a multispectral biometric image of a human hand, the method comprising:
    illuminating at least a portion of a target surface of a platen;
    receiving light from at least a portion of the target surface under a first optical condition;
    separately receiving light from at least a portion of the target surface under a second optical condition substantially simultaneously as receiving light from the target surface under a first optical condition, wherein the first optical condition and the second optical condition are distinct; and
    deriving a multispectral image of a skin site of the hand of a purported individual placed within the target surface from the light received under either or both of the first optical condition and the second optical condition.

11. The method according to claim 10, wherein the first optical condition and the second optical condition is selected from the group consisting polarized light, total internally reflected light, light with specific wavelength, light within a specific wavelength band, light from a first subspace within the target space, and light from a first focal plane within the target space.

12. The method according to claim 10, wherein a first imager provides a first image of at least a portion of the target space under the first optical condition and a second imager provides a second image of at least a portion of the target space under the second optical condition.

13. The method according to claim 10, wherein first image has a resolution greater than the resolution of the second image.

14. The method according to claim 10, further comprising detecting the presence of an object on the target surface.

15. A biometric system comprising:
    illumination means for illuminating a target space defined at least in part by a platen;
    first imaging means for imaging at least a portion of the target space under a first optical condition and providing a first image;
    second imaging means for imaging at least a portion of the target space under a second optical condition distinct from the first optical condition and providing a second image; and
    processing means for controlling the illumination means, the first imaging means and the second imaging means, wherein the processing means is configured to derive a multispectral image of a skin site of the hand from the first image and the second image.

16. The biometric system according to claim 15, further comprising presence sensing means for sensing the presence of an object within at least a portion of the target space.

17. The biometric system according to claim 15, wherein the first optical condition and the second optical is selected from the group consisting polarized light, total internally reflected light, light with specific wavelength, light within a specific wavelength band, light from a first subspace within the target space, and light from a first focal plane within the target space.

18. The biometric system according to claim 15, wherein the illumination means includes a broadband light source.

19. The biometric system according to claim 15, wherein the first imaging means includes a wafer-level camera and the second imaging means includes a wafer-level camera.

20. The biometric system according to claim 15, wherein the first imaging means includes a first processor and the second imaging means includes a second processor.

21. The biometric system according to claim 15, wherein the first optical condition includes imaging a first portion of the target space and the second optical condition include imaging a second different portion of the target space.

* * * * *